United States Patent
Devereux et al.

(10) Patent No.: US 11,179,661 B2
(45) Date of Patent: Nov. 23, 2021

(54) MOISTURE EXTRACTION ASSEMBLY HAVING A CELLULAR STRUCTURE WITH INTERCONNECTED CELLS

(71) Applicant: Chrius Technologies Limited, Atcham (GB)

(72) Inventors: Christopher Devereux, Frome (GB); Ronghui Zhang, Guangdong (CN)

(73) Assignee: CHRIUS TECHNOLOGIES LIMITED, Atcham (GB)

( * ) Notice: Subject to any disclaimer, the term of this patent is extended or adjusted under 35 U.S.C. 154(b) by 190 days.

(21) Appl. No.: 16/092,859

(22) PCT Filed: Apr. 12, 2017

(86) PCT No.: PCT/EP2017/058886
§ 371 (c)(1),
(2) Date: Oct. 11, 2018

(87) PCT Pub. No.: WO2017/178570
PCT Pub. Date: Oct. 19, 2017

(65) Prior Publication Data
US 2019/0126180 A1 May 2, 2019

(30) Foreign Application Priority Data
Apr. 12, 2016 (GB) ..................... 1606289

(51) Int. Cl.
*B01D 45/08* (2006.01)
*B01D 53/26* (2006.01)
(Continued)

(52) U.S. Cl.
CPC ............. *B01D 45/08* (2013.01); *B01D 45/16* (2013.01); *B01D 53/26* (2013.01); *B04C 3/04* (2013.01);
(Continued)

(58) Field of Classification Search
None
See application file for complete search history.

(56) References Cited

U.S. PATENT DOCUMENTS 1,606,749 A   11/1926  Clark et al.
3,396,515 A *  8/1968  Wright .................. B01D 53/26
                                                       55/525
(Continued)

FOREIGN PATENT DOCUMENTS

CN    2486746 Y    4/2002
CN    1883763 A   12/2006
(Continued)

OTHER PUBLICATIONS

Notification of Transmittal of the International Search Report and the Written Opinion of the International Search Authority (Form PCT/ISA/220), International Search Report (Form PCT/ISA/210), and Written Opinion of the International Searching Authority (Form PCT/ISA/237) for International Patent Application No. PCT/EP2017/058886 dated Oct. 4, 2017 (17 pages).
(Continued)

*Primary Examiner* — Derek N Mueller
(74) *Attorney, Agent, or Firm* — Withrow & Terranova, P.L.L.C.; Vincent K. Gustafson

(57) ABSTRACT

The invention provides a moisture extraction assembly for removing moisture from compressed air. The assembly is formed of two or more unitary bodies which assemble in facing relationship to define a cellular network structure of variously connected cells which collectively define one or more air flow paths extending between at least one inlet and at least one outlet.

20 Claims, 17 Drawing Sheets

(51) Int. Cl.
    *B60T 17/00*     (2006.01)
    *B01D 45/16*     (2006.01)
    *B04C 3/04*     (2006.01)
    *B04C 3/00*     (2006.01)

(52) U.S. Cl.
    CPC ...... *B60T 17/004* (2013.01); *B04C 2003/006* (2013.01)

(56) References Cited

U.S. PATENT DOCUMENTS

| | | | |
|---|---|---|---|
| 3,720,046 A * | 3/1973 | Kudirka | B01D 45/08 55/414 |
| 4,889,544 A | 12/1989 | Hsu | |
| 6,726,752 B2 | 4/2004 | Chen | |
| 2015/0306528 A1 | 10/2015 | Mueller | |

FOREIGN PATENT DOCUMENTS

| | | |
|---|---|---|
| CN | 2894852 Y | 5/2007 |
| CN | 101513581 A | 8/2009 |
| CN | 201371017 Y | 12/2009 |
| CN | 203355478 U | 12/2013 |
| CN | 105435563 A | 3/2016 |
| GB | 2456899 A | 8/2009 |

OTHER PUBLICATIONS

Search Report under Section 17(5) for United Kingdom Patent Application No. GB1606289.5 dated Nov. 28, 2016 (4 pages).
First Office Action for Chinese Patent Application No. 201780036623.6, dated Jan. 21, 2021, 15 pages.
Examination Report for European Patent Application No. 17716924.0, dated Aug. 13, 2019, 4 pages.
Search Report under Section 17(5) for United Kingdom Patent Application No. GB1606286.1, dated Nov. 30, 2016, 3 pages.
Second Office Action for Chinese Patent Application No. 201780036623.6, dated Aug. 17, 2021, 17 pages including English translation.
Examination Report under Section 18(3) for United Kingdom Patent Application No. GB1606289.5 dated Sep. 2, 2021, 2 pages.
Examination Report under Section 18(3) for United Kingdom Patent Application No. GB1606286.1 dated Sep. 2, 2021, 1 page.
Examination Report under Section 18(3) for United Kingdom Patent Application No. GB1606288.7 dated Sep. 2, 2021, 1 page.

* cited by examiner

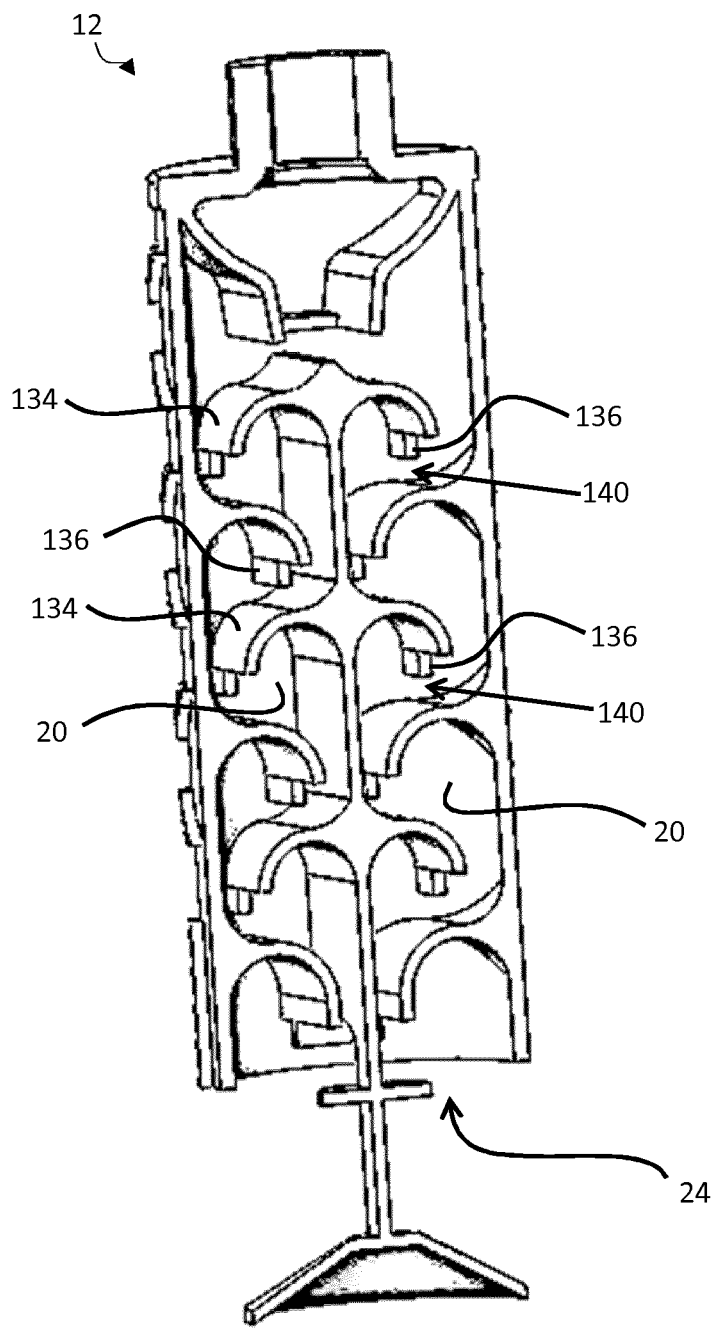
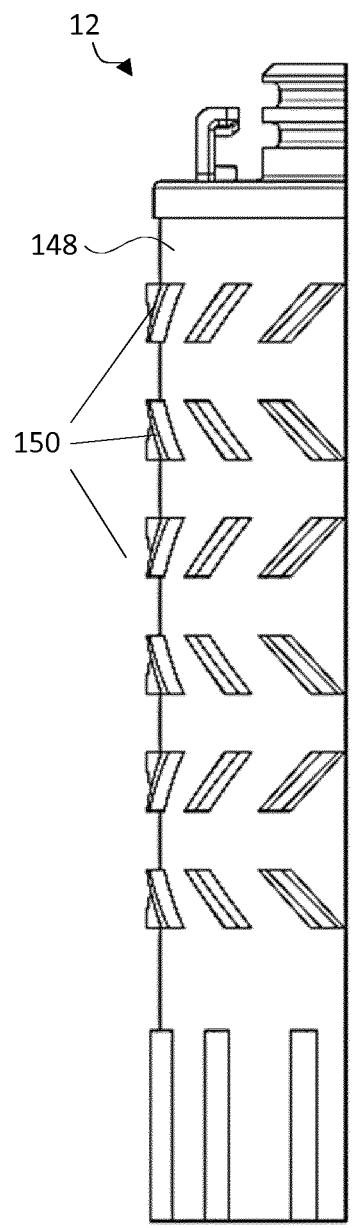
FIG. 14
FIG. 15

MOISTURE EXTRACTION ASSEMBLY HAVING A CELLULAR STRUCTURE WITH INTERCONNECTED CELLS

CROSS-REFERENCE TO RELATED APPLICATIONS

This application is a 35 U.S.C. § 371 national phase filing of International Application No. PCT/EP2017/058886 filed Apr. 12, 2017, and claims the benefit of United Kingdom Patent Application No. 1606289.5 filed Apr. 12, 2016. The entire disclosures of the foregoing applications are hereby incorporated by reference herein, in their respective entireties.

FIELD OF THE INVENTION

This invention relates to a moisture extraction assembly for use in removing moisture from compressed air, a moisture extractor for removing moisture from compressed air, and methods for the same.

BACKGROUND OF THE INVENTION

Extraction or removal of moisture from compressed air is a necessary process in many operations in which high pressure air is used. Removal of moisture and often other impurities such as dust or dirt in advance of the air being used may help to prevent damage to machinery for example.

U.S. Pat. No. 6,726,752 B2 discloses one example of a moisture extraction device as known in the art. The device comprises an assembly of stacked chambers, connected together in series to thereby define a single air flow path between a single inlet, formed through the lowermost chamber, and a single outlet formed through the uppermost chamber. The assembly is arranged within a containing chamber delimited by an outer housing, with the inlet of the assembly communicating with the containing chamber, and the outlet communicating with a secondary outlet formed through the housing.

GB 2456899B also discloses a similar set of devices, each comprising stacked chambers connected in series to delimit a single air flow path from an inlet at the lowermost chamber, to an outlet at the uppermost chamber.

Moisture extraction devices are also disclosed in U.S. Pat. No. 1,606,749, these each comprising a housing containing a stacked arrangement of baffle units, fluidly connected in series, each baffle unit comprising two baffling disks for baffling incident air, and having passageways formed therethrough to allow passage of air to the next baffle unit.

It is known that efficiency of moisture removal from state of the art devices such as those disclosed in the above documents is not ideal, with air leaving the device still containing non-negligible quantities of moisture. Furthermore, it is difficult to significantly improve the efficiency of such devices (through simple enlargement or expansion for example) without accepting significant compromises in terms of device size, expense, or complexity of manufacture.

There is a need therefore for a moisture extraction assembly which is capable of providing improved extraction efficiency without significantly expanded overall dimension, or significantly increased overall cost or complexity of manufacture.

SUMMARY OF THE INVENTION

The invention is defined by the claims.

It has been recognised by the inventors of the presently claimed invention that greater efficiency, without significantly expanded size or increased cost, necessitates a greater complexity of shape and form than is currently known in the art. This in turn can facilitate more complex arrangements of air flow paths and more complex configurations of extraction chambers and surfaces, which may enable significantly improved efficiency without the above-mentioned compromises. A need has therefore been identified for a moisture extraction assembly in which such forms can be realised.

It has further been recognised that currently prevailing assumptions regarding manufacturability constraints and requirements have imposed significant limitations on achievable shapes and forms and achievable air flow configurations. This in turn has constrained achievable extraction efficiencies. It has consequently been realised by the inventors that devices having significantly improved extraction capability may be achievable through consideration of new modes of construction and/or assembly.

Accordingly, there is provided in accordance with a first primary aspect of the invention, a moisture extraction assembly for use in removing moisture from compressed air, the assembly comprising a plurality of unitary bodies, wherein each unitary body has a formed surface in which is provided a plurality of recesses, wherein the unitary bodies are assembled together with their respective formed surfaces in facing relationship so as to close the recesses and thereby define a cellular structure of interconnected cells, each cell being defined by at least one of the recesses, wherein the assembled unitary bodies define at least one air inlet and at least one air outlet of the assembly, the air inlet and the air outlet being in fluid communication with respective different cells of the cellular structure to define at least one air flow path, the air flow path extending from the air inlet to the air outlet via a plurality of cells in series, whereby moisture can be collected on walls of the cells.

The assembled unitary bodies thus come together to form an extraction assembly which, when assembled, effectively consists of a solid body (formed of multiple pieces) comprising a plurality of hollows or chambers (cells) formed within its volume which are variously inter-connected to define at least one air flow path across the assembly. The cells of the thus formed cellular network or cellular structure may act as extraction chambers to encourage or elicit separation of at least moisture from passing air.

As will be described below, the thus provided cellular structure enables, according to examples, complex configurations of extraction cells and air flow paths to be provided without the manufacturing complexity which would typically arise from attempting to provide such arrangements or configurations by means of assemblies of conventional structural elements. For example, crafting each cell as a separate component to be together assembled to form the overall cellular network would be greatly expensive and time-consuming. Furthermore, mounting the cells in a space-efficient arrangement would require either complex fixing attachments, or the manufacturing for example of a separate frame structure to support the various chambers and other connecting components which would again add cost, manufacturing complexity, time, and bulk or weight to the finished device.

The present invention comprising cells or hollows delimited within a substantially solid body enables high levels of complexity of design with limited cost. Furthermore, simulations performed by the inventors have demonstrated that the more complex configurations achievable by the present invention are able to realise moisture extraction efficiencies approaching 100%.

These formations are achievable in the present invention by means of an assembly which is constructed, as described above, from multiple parts, each individually easy to fabricate but which together combine to form a cellular network structure which would be highly complex or even impossible to manufacture as a single piece. The relative simplicity of each individual component also means that a greater complexity of the completed structure does not necessitate greater complexity of the overall manufacturing process.

The provided assembly is also highly flexible in terms of its specific configuration. The concept may be applied to produce extraction assemblies having any of a vast array of different configurations or arrangements, for example by varying (either within the same assembly, or across different assemblies consistent with the invention) cell sizes, positions, interconnections or orientations. These may all be adapted or varied without significantly adding to the cost of complexity of manufacture.

This stands in contrast for example with well-known fabrication methods in the art, in which each extraction chamber might be individually formed and individually positioned or mounted relative to other components forming the assembly.

In particular embodiments, the phrase 'plurality of recesses' may be understood as meaning simply an arrangement or configuration of recesses or depressions. In accordance with at least some examples, the recesses may be closed. In accordance with other examples, at least a subset of the recesses may be open, in the sense of freely or continuously interconnected with one another. The recesses may be delimited from one another by internal walls, where those internal walls may or may not fully separate each recess from every other recess. The invention requires that, upon assembly of the unitary bodies, the arrangement of recesses formed in the respective formed surfaces of the bodies close to define a network of variously interconnected cells, each cell being delimited by at least one of the recesses. The precise state of interconnection of the recesses formed in each unitary body is not critical to the inventive concept defined in its broadest sense.

It is to be noted that although 'air' is referred to in the claims, the invention is not limited to the processing of atmospheric air, but may be applied with equal advantage to moisture extraction from other compressed gasses. It would be immediately recognised by the skilled person that a device suitable for processing air may without adaptation be applied to the processing of any other gas.

It is further to be noted that according to at least some examples, it is anticipated that the presently claimed extraction assembly may be applied to the separation not only water from air, but also of oil, aerosols, dust, other particulates, and/or other contaminants.

Furthermore, a particular advantage of the presently disclosed invention is that, according to at least one or more anticipated embodiments, the multiple unitary bodies forming the structure may be dismantled subsequent to assembly and use, so as to provide access to the interiors of the cells (i.e. to the recesses of each unitary body), thereby enabling cleaning of the cells. This provides significant advantage in cases where the device is used to extract not only moisture but also dust or other particulates or contaminants which may over time build up within the cells of the structure, reducing efficiency, or even compromising functionality.

Such build-ups of contaminants may be straightforwardly and thoroughly cleaned from the device, since easy access to the cells is achievable.

It is noted that according to this aspect of the invention, the air inlet and the air outlet are provided in fluid communication with respective different cells of the cellular structure. By this may be meant in particular 'in direct fluid communication' with different respective cells (i.e. not via another one of the cells).

Certain particularly advantageous embodiments of this first aspect of the invention will now be briefly outlined below.

According to one or more particular examples, each air inlet and each air outlet may comprise a fluid passageway extending from an outer surface of the assembled unitary bodies to at least one of the cells. Additionally or alternatively, the cells of each air flow path may be interconnected by fluid passageways.

The fluid passageways may for example comprise one or more channels or conduits, or may comprise any other interconnection configured to allow the passage of fluid or gas.

In preferred examples, the cells of the cellular structure are delineated by a structure of internal dividing walls formed by the plurality of recesses. In such cases, at least the fluid passageways interconnecting the cells of each air flow path may in accordance with one or more examples be formed by: fluid channels extending through said dividing walls; lowered sections formed in one or more of said walls; and/or discontinuities in said dividing walls.

By fluid passageways formed through the dividing walls is meant for instance channels or tunnels extending through the walls from one cell to the next. Such channels or tunnels may typically extend only through a central or body portion of the wall, i.e. not extending for instance to the top or lip of the wall. Such channels may for example provide a focused or concentrated air flow, or greater air speed, by virtue of a relatively restricted cross-sectional area. This may be of advantage in cases where speed of air flow between cells is particularly important. Greater speed of airflow between cells may increase moisture extraction efficiency.

By 'lowered sections formed in the dividing walls' is meant that one or more of the walls may only extend to a partial height, relative for instance to a height of remaining walls of the given cell. Height is to be interpreted in its normal sense as used in relation to a wall, as meaning its extension in a direction from a base (where it meets the floor of a given recess) and its lip (the upper edge where the wall ends). Such lowered portions hence provide fluid passageways in the form of notches or gaps formed into the top of one or more of the walls. Gas may hence flow between cells through these notches defined by the truncated height wall sections. Such an arrangement may for example provide for a greater rate of air flow between cells, which may be beneficial for instance in cases of an air flow path comprising a large number of cells, where it may be desirable to minimise pressure drop across the air flow path. A partial-height wall type arrangement between interconnected cells may also offer benefits in extraction efficiency, since the truncated wall may physically interact with passing air in such a way as to generate more tortuous air flow (compared for instance with a channel extending through an otherwise full-height wall).

By 'discontinuities' in the wall is meant complete lateral breaks or spaces in one or more of the walls, where by lateral is meant in a direction transverse to a height of the wall.

Discontinuities effectively provide freely interconnected cells. Discontinuities may offer the greatest rate of air flow between interconnected cells, which as noted above, may be of advantage for long chains of cells where it is desired to minimise pressure drop across the chain. However, discontinuities may (though not necessarily) induce relatively less tortuous air flow than other configurations, which may be of relevance where maximal extraction efficiency is the priority.

In accordance with one or more particular examples, the dividing walls between cells of each air flow path may be arcuately shaped such as to channel air via said fluid passageways obliquely from each cell onto a delineating wall of a neighbouring cell. In these examples, the dividing walls are shaped such as to guide air into the next cell arranged in series obliquely against a receiving wall of that cell. This may encourage a swirling motion of air as it enters the next cell which may improve extraction efficiency by for instance increasing a speed of the air within the next cell, or encouraging more tortuous flow of the air within the next cell.

In embodiments, each unitary body may consist of a single, solid, three-dimensional piece having cavities provided in one or more surfaces. In particular examples, each unitary body may be a cast or moulded component, and optionally may be a moulded plastics component. Moulding provides a simple and inexpensive means of providing complex patterns or arrangements of cavities, which in turn may provide complex arrangements, configurations and interconnections of cells within the cellular structure.

Casting methods also allow for simple formation of these arrangements, and may include for instance die casting or gravity casting methods. The unitary bodies in accordance with one or more particular examples may be formed from cast aluminium for instance.

Although moulding is given as an example, it will be recognised that other fabrication means might also be used to produce the unitary bodies. For example, the bodies may be machined, or may consist of single, solid pieces having the cavities machined, etched or cut from their surface. Cavities might also be formed by chemical methods for instance.

In examples, at least a portion of the recesses provided in the formed surface of each unitary body may be surrounded by a planar surface. In some cases, at least a portion of the cells are only partially surrounded by such a planar surface (for instance in cases where one or more fluid passageways between cells are formed by inclusion of lower wall sections in some dividing walls between cells. In all cases, a planar surface at least partially surrounds all recesses of each unitary body.

The planar surfaces of facing unitary bodies allow these bodies to be fitted flush against one another, thereby providing sound sealing of the cells, and preventing leakage of gas from the assembly.

The unitary bodies may, in examples, be assembled together with their respective formed surfaces in direct facing relationship, such that each cell is defined by both forming surfaces of the facing unitary bodies. According to these examples, each single cell is jointly delimited by at least two of the unitary bodies. Recesses provided in surfaces of facing unitary bodies may be configured to align and correspond with one another for example, so as to convexly engage on assembly of the structure, and thereby together delimit the cells of the cellular structure.

According a different set of examples however, the unitary bodies may instead be assembled together with their respective formed surfaces interposed by a forming plate, such that each cell is defined by the formed surface of one unitary body and a surface of the forming plate. This provides a simple and easy means of expanding the number of cells provided by the cellular structure. The expansion in quantity is of course accompanied by a reduction in the size of each cell. Where it is preferred on the contrary to have a smaller number of larger cells, the examples of the previous paragraph may be preferable.

In accordance with one or more embodiments, the assembled unitary bodies may define a plurality of parallel air flow paths from the at least one air inlet to the at least one air outlet, each air flow path extending through a different plurality of cells in series.

By providing multiple series chains of two or more interconnected cells, defining parallel air flow paths through the extraction assembly to the air outlet, one is able to achieve enhanced water removal efficiency without diminishing overall flow rate through the assembly, and without incurring an increased drop in pressure across the device (as would naturally occur were one to provide a single series chain encompassing the same overall number of cells for example).

For the avoidance of doubt, the terms 'parallel' and 'series' are to be understood conceptually, as opposed to geometrically; as referring to a connectional relationship, rather than a spatial or geometrical one. By 'parallel' flow-paths is meant flow paths connected in parallel fashion, as opposed to flow paths geometrically oriented parallel with one another. The terms parallel and series are intended to be understood by analogy with their usage in relation to electrical circuits for example.

The plurality of air flow paths may each be provided with a respective unique air inlet, and/or the plurality of air flow paths may have a shared air outlet. Providing each air flow path with a unique inlet may further maximise the air flow through the assembly and likewise minimise the pressure drop incurred across the assembly. Providing a shared outlet enables efficient delivery of the output filtered air for subsequent use or further transport.

The assembled unitary bodies may have a central axis defining an axial direction of the assembly, and the cells of each air flow path may be axially displaced with respect to one another, such that, when the axis is aligned vertically, moisture collected on the walls of one cell is able to drain into an adjacent cell under gravity. Such an arrangement may be important to help prevent extracted water building up within cells of the structure. This could reduce water extraction efficiency of the structure by increasing air resistance or reducing volumetric capacity of one or more of the cells, thereby reducing overall flow rate of air through the cell. Built up water might also occlude one or more of the water-collecting internal surfaces of the cell, thereby also reducing water-extraction efficiency.

By 'axially displaced' is meant displaced at least in part along the axial direction. In examples, each cell may have a central point (or centre of gravity) and the respective central points of cells of each air flow path may be axially displaced from one another.

By 'aligned vertically' is meant aligned substantially vertically; aligned along a vector having non-zero vertical component. In particular examples, the fluid passageway interconnecting any two cells may be axially aligned.

The air flow paths may be distributed circumferentially about the central axis referred to above and/or along the axial direction, and the cells of each air flow path may be arranged along the axial direction. By circumferentially around is meant arranged around the central axis, being displaced from one another at least in part along a circumferential or azimuthal direction. Such an arrangement may maximise spatial efficiency of the device, by enabling a maximal number of cells to be fitted within the body of the assembly. It may also in certain examples assist in maximising air flow rate or minimising pressure drop across the device, in particular where each of a plurality of parallel air flow paths is provided with a unique inlet. Here, circumferential arrangement of cells may maximise the number of possible such inlets and hence the possible number of air flow paths.

According to one or more embodiments, each air flow path may have a respective different air inlet, with each of the air inlets comprising a passageway extending in a direction transverse to the axial direction, wherein the plurality of air flow paths have a shared air outlet, the air outlet comprising an axial passageway extending along, and defining, the central axis, and wherein the air outlet optionally further comprises branch passageways extending from the axial passageway to the cells of respective different air flow paths.

The air inlets and air outlets are oriented such that, when the central axis is aligned vertically, moisture collected on the walls of air flow paths is able to drain out of the air inlets under gravity. This may help to maximise draining of collected water from the assembly which, as discussed above, may enhance the overall water extraction efficiency of the device.

In examples, each of the branch passageways may comprise a lower lip portion which protrudes part-way into the axial passageway so that moisture running along the wall of the axial passageway flows into a respective air flow path and is able to drain out of the air inlets under gravity.

Each air flow path may comprise an axially aligned stack of two or three cells, wherein the air flow paths are distributed in a three dimensional array comprising four air flow paths distributed circumferentially about the central axis and at least four, preferably five, air flow paths distributed along the axial direction.

In accordance with at least a subset of embodiments, the plurality of air flow paths may have a single shared air inlet and a single shared air outlet.

There may in embodiments further be provided a securing means for maintaining the assembled unitary bodies in facing relationship.

According to particular examples, the securing means may comprise a sleeve which extends around the assembled unitary bodies, wherein spacing elements are optionally arranged between the sleeve and the assembled unitary bodies to prevent occlusion of each air inlet and/or each air outlet. The sleeve may comprise in examples a solid inflexible body, or on the contrary may comprise a flexible or elastic body.

In one or more examples, the assembled unitary bodies may define a substantially cylindrical form, wherein optionally the assembly has two unitary bodies each defining a semi-cylinder. In alternative optional examples, there may be provided three or more unitary bodies, each comprising a wedge-shape, consisting of a fractional portion of the assembled cellular structure. The unitary bodies may comprise for example thirds, or quarters of the cellular structure.

In accordance with a further aspect of the invention, there is provided a moisture extractor for removing moisture from compressed air, the moisture extractor comprising:

a housing defining a chamber and having an air inlet and an air outlet; and a moisture extraction assembly according to any of the embodiments outlined above or described in subsequent sections of this document, wherein the moisture extraction assembly is mounted inside the chamber such that the air inlet of the housing is in fluid communication with each air inlet of the moisture extraction assembly and the air outlet of the housing is in fluid communication with each air outlet of the moisture extraction assembly.

The chamber arrangement provides one convenient means of delivering compressed air from a single incoming inlet to the one or more inlet(s) of the extraction assembly. Furthermore, the chamber may itself provide significant independent water-extraction capacity, the walls of the chamber acting to collect moisture or encourage separation of water from incoming air. The chamber may also be shaped to encourage tortuous flow of the air, which helps in the separation of moisture or other particulate or fluid contaminants. The walls of the chamber might also be roughened to increase surface area, and hence enhance air-surface contact time and moisture extraction efficiency.

According to one or more examples, the housing may comprise:

a tube member having a tubular wall and first and second ends; and a cover member arranged covering the first end of the tube member, wherein the air inlet and air outlet of the housing are formed in the cover member, and wherein the moisture extraction assembly is attached to the cover member and is arranged coaxially with the tube member.

In particular examples, the extraction assembly may be provided with a sleeve as a securing means (as discussed above). In these examples, this sleeve may be attached to the cover member and may divide the chamber into an outer annular channel and an inner axial channel, the channels being connected at the second end of the tube member, wherein the air inlet of the housing extends into the outer annular channel, the assembled unitary bodies being arranged within the inner axial channel.

In accordance with certain other examples, the tube member of the housing itself may serve as a securing means of the moisture extraction assembly, being arranged to extend around the assembled unitary bodies of the moisture extraction assembly such as to maintain the unitary bodies in facing relationship.

In some examples, the second end of the tube member may further be provided with:

a drain for allowing the escape of moisture which has been extracted from the compressed air; and/or a baffle for directing air flows from a direction towards the second end of the tube member to a direction away from the second end of the tube member.

The baffle may help in containing the air within the chamber or may help in re-directing incoming air toward the one or more inlets of the extraction assembly. The baffle may also provide some moisture extraction functionality, by inducing a sudden change in direction of the air, and hence encouraging separation of moisture from air.

According to a further aspect of the invention, there is provided a method for making a moisture extraction assembly for use in removing moisture from compressed air, the method comprising:

providing a plurality of unitary bodies, each unitary body having a formed surface in which is provided with a plurality of recesses; and assembling the unitary bodies together with their respective formed surfaces in facing relationship so as to close the recesses and thereby define a cellular structure of interconnected cells, each cell being defined by at least one of the recesses, wherein the assembled unitary bodies define at least one air inlet and at least one air outlet of the assembly, the air inlet and the air outlet being in fluid communication with respective different cells of the cellular structure to define at least one air flow path, the air flow path extending from the air inlet to the air outlet via a plurality of cells in series, whereby moisture can be collected on the walls of the cells.

This method enables an extraction assembly to be formed, in which complex configurations of extraction cells and air flow paths may be provided, without the manufacturing complexity which would arise from attempting to provide such arrangements or configurations through assemblies of conventional structural elements.

The method is based on constructing the device through the assembly of a plurality of parts, each individually easy to fabricate but which together combine to form a cellular network structure which would be highly complex or even impossible to manufacture as a single piece. The relative simplicity of each individual component also means that a greater complexity of the completed structure does not necessitate greater complexity of the overall manufacturing process.

The method may, according to one or more examples, be advantageously employed to make a moisture extraction assembly in accordance with any of the extraction assembly embodiments outlined above.

Furthermore, in accordance with one or more embodiments, the method may comprise the further step of assembling the moisture extraction assembly into a housing to thereby provide a moisture extractor in accordance with any of the example moisture extractors described above.

In accordance with a second primary aspect of the invention, there is provided a moisture extractor for removing moisture from compressed air, the moisture extractor comprising:

a housing defining a chamber, the housing formed of a tube member having a tubular wall with first and second ends and a cover member arranged covering the first end of the tube member, the cover member having an air inlet and an air outlet; and one or more annular baffles arranged extending into the chamber coaxially with the tube member, the baffles dividing the chamber into one or more parallel outer annular air-flow regions and an inner axial air-flow region, the outer air-flow regions and the inner air-flow region being connected at the second end of the tube member, the air inlet communicating with the one or more outer annular air-flow regions and the air outlet communicating with the inner axial air-flow region such that an air flow path is defined from the air inlet to the air outlet via the one or more outer annular air-flow regions and the inner axial air-flow region in series, wherein each of the one or more outer annular air-flow regions is provided with a first array of vanes for directing air flow in a first helical path having a first direction of rotation and a second array of vanes, arranged in series with the first array, for directing air flow in a second helical path having a second direction of rotation which is opposite to the first direction of rotation.

A particular embodiment of the second primary aspect of the invention is a moisture extractor for removing moisture from compressed air, the moisture extractor comprising:

a housing defining a chamber, the housing formed of a tube member having a tubular wall with first and second ends and a cover member arranged covering the first end of the tube member, the cover member having an air inlet and an air outlet; and a sleeve mounted to the cover member to extend into the chamber coaxially with the tube member, the sleeve dividing the chamber into an outer annular channel and an inner axial channel, the channels being connected at the second end of the tube member, the air inlet communicating with the outer annular channel and the air outlet communicating with the inner axial channel such that an air flow path is defined from the air inlet to the air outlet via the outer annular channel and the inner axial channel in series, wherein the outer annular channel is provided with a first array of vanes for directing air flow in a first helical path having a first direction of rotation and a second array of vanes, arranged in series with the first array, for directing air flow in a second helical path having a second direction of rotation which is opposite to the first direction of rotation.

The following statements and provided options and embodiments are compatible with any embodiment of the second primary aspect.

By 'arranged in series' is to be understood to mean arranged in fluid series, wherein the second array of vanes is located 'down-flow' from the first. In at least some examples, the second array of vanes may be located at a point somewhere along first helical path, i.e. within the outgoing flow path of the first array of vanes.

The term 'vane' is to be interpreted broadly, as denoting for example any variety of member or protrusion suitable for directing or re-directing air-flow in one or more directions. A vane may for example comprise a protruding fin or blade or slat, or may comprise any form of plate or sheet member.

By 'helical' is meant either helical or spiral, and is to be interpreted broadly as denoting any path encompassing a combination of both rotational and axial directions (or motion). The helical path may have a constant radius of rotation or a varying radius of rotation. A helical path may in examples consist of a substantially cylindrically-shaped path, or a substantially cone-shaped path. In certain examples the helical path may be such as to induce a vortex within the outer annular region and/or the inner axial region.

By inducing helical motion, air may be encouraged or induced to circulate around the interior periphery of the housing, as well as around the interior periphery of any further intermediate annular baffles where more than one is provided. Such circulation may enhance moisture-extraction efficiency, since a single internal surface of the housing/chamber (and any additional annular baffles) can be re-used multiple times in collecting or extracting/separating water from the air. Hence contact time of the air with internal surfaces in the chamber can be increased without increasing the dimension of the chamber or slowing the speed of the incoming air for instance.

Furthermore, as well as increasing the air-surface contact time, centrifugal forces induced by circulation of the air help to separate the (heavier) water, oil, aerosols or particles from the (lighter) air, and force these heavier elements against the wall of the housing or additional baffle elements where more than one is provided, where they may then be collected and drained away.

Circulation of the air may generally also slow the rate at which the air travels axially through the chamber, and hence slow the overall flow rate through the chamber. This increases dwell time of the air within the chamber, which may help to increase the efficiency of moisture extraction, by allowing more time for the above described separation processes to act on the air.

By providing two sets of vanes in series in each of the one or more outer annular air flow regions, configured to direct air in respective opposing helical directions, large acceleration forces are imposed or exerted on the air, which helps to promote coalescence of water, oil, aerosol or particles contained within the air. As these contaminants coalesce, they form larger, heavier drops or particles, thereby increasing the rate at which they may fall from the air by gravity or be forced to the side of the chamber by centrifugal forces.

According to some examples, the plural sets of vanes may even induce turbulent flow within the air, which may further increase coalescence of moisture and other contaminants. In preferred examples however, the plural sets of vanes are simply arranged or configured to produce rapid rotational flow(s), where these are of a non-chaotic nature.

In accordance with one or more embodiments, each of the one or more outer annular air flow-regions of the moisture extractor may be further provided with at least one further array of vanes for directing air flow in a further helical path, the further array being arranged in series with the first and second arrays, wherein the air flow through the arrays has alternating directions of rotation.

A greater number of sets of vanes in each of the one or more annular air flow regions, arranged to direct air in alternating directions, enable further acceleration forces to be applied to the air, hence encouraging further coalescence of moisture and other contaminants. It may also further increase air-surface contact time, thereby also improving extraction efficiency.

Additionally or alternatively, in further examples, there may be provided in each of the one or more annular air flow regions multiple sets or arrays of vanes, these multiple sets being arranged collaboratively in series and so as to collectively direct or guide air-flow along a particular helical direction or path. These multiple sets may be configured and arranged to each direct or guide air along or into a successive section of a particular path for instance.

According to a further one or more examples, there may additionally be provided one or more further air-directing means, arranged in-between the first and second arrays of vanes in each of the one or more annular air flow regions and adapted to direct the air in a substantially axial direction, where the axial direction is defined by a central axis running through the chamber, parallel with the direction of the walls of the tubular member. Hence according to these examples, air-flow is redirected from the first helical direction into a substantially axial direction in advance of subsequently being re-directed by the second array of vanes into the second helical direction.

In one or more examples, the vanes of each array may be distributed about an axis of the moisture extractor (the axis defining an axial direction), the vanes being spaced apart or distributed in the circumferential direction.

The vanes of one or more of the arrays may be arranged on an inner surface of the tube member and/or an outer surface of at least one of the one of more baffles.

In examples, each vane of one or more of the arrays may comprise an elongate wall which extends from the inner surface of the tube member and/or the outer surface of at least one of the one or more baffles.

The moisture extractor may comprise a single baffle, defining a single outer annular air flow region, or may comprise a plurality of baffles to thereby define a plurality of parallel outer annular air flow regions. By parallel may be meant annularly parallel, wherein the plurality of baffles are arranged concentrically to define a concentric arrangement of annular air flow channels extending between the baffles, and annularly about a periphery of the housing.

The plurality of annular air flow regions are also parallel in a functional sense, of each providing separate, independent air flow channel extending from the air inlet of the housing and into the chamber. Hence by providing multiple baffles, the advantageous effects described above in terms of increased extraction efficiency due to the circulating air and induced tortuous flow may be multiplied. Each provided outer annular air flow region, provided with a respective first and second array of vanes, applies a separate tortuous air flow action on a portion of the incoming air. Each portion is hence processed with the same action, and therefore the overall extraction effect upon the full air flow is multiplied.

In accordance with one or more embodiments of this second primary aspect of the invention, the moisture remover may further comprise a moisture extraction assembly in accordance with any of the moisture extraction assembly embodiments described above (in relation to the first primary aspect of the invention). The moisture extraction assembly may be fluidly connected with the air outlet. An interior of the moisture extraction assembly may at least partially define said inner axial air flow region of the moisture extractor.

In one described embodiment of a moisture extraction assembly, the assembly comprised a sleeve extending around the assembled unitary bodies of the assembly to act as a securing means maintaining the unitary bodies in facing relationship (see above). Where the moisture extractor of the present primary aspect comprises an extraction assembly of this variety, said securing sleeve may serve as one of the one or more annular baffles.

In accordance with certain other examples (where the extraction assembly does not comprise such a sleeve), the moisture extraction assembly may be arranged to extend into the chamber from the cover member coaxially with the tube member, and an annular outer wall of the moisture extraction assembly may serve as one of the one or more baffles of the moisture extractor. An interior of the moisture extraction assembly in this case may define said inner axial air flow region.

According to a further aspect of the invention, there is provided a method of extracting moisture from air, the method comprising:

receiving an air flow through an air inlet into one or more outer annular air flow regions of a chamber delimited by a tube member and one or more annular baffles arranged inside the tube member;

directing the air flow in a first helical path having a first direction of rotation;

re-directing the air flow from the first helical path into a second helical path having a second direction of rotation which is opposite to the first direction of rotation; and receiving the air flow into an inner axial air-flow region of the chamber delimited by one of the one or more baffles, the inner axial air-flow region being fluidly connected with an air outlet.

In examples, the method may further comprise passing the air through a moisture extraction assembly the moisture extraction assembly being fluidly connected with the air outlet, and an interior of the moisture extraction assembly at least partially defining said inner axial air flow region of the moisture extractor.

It is to be noted that it is anticipated that any features described in the present application in relation to one particular aspect of the present invention may also be advantageously applied to, or combined with, features or embodiments described in relation to other aspects of the invention.

In accordance with a third primary aspect of the invention, there is provided a moisture extraction assembly for use in removing moisture from compressed air, the assembly comprising:

a cellular structure of interconnected cells;

at least one air inlet and at least one air outlet, the air inlet and the air outlet being in fluid communication with respective different cells, wherein the air inlet and the air outlet are in fluid communication with respective different cells of the cellular structure to define at least one air flow path, the air flow path extending from the air inlet to the air outlet via a plurality of cells in series, whereby moisture can be collected on the walls of the cells, and wherein at least one of the cells of the cellular structure is a swirl chamber which is shaped to induce a swirling airflow within the chamber.

For example, the swirling airflow may be achieved by providing the swirl chamber with walls which define a minimum radius of 3 mm, preferably 5 mm, more preferably 8 mm, and most preferably 12 mm, such that the cell has a rounded internal shape.

Additionally or alternatively, the swirling airflow may be achieved by providing the swirl chamber having at least one cross section which is substantially circular or elliptical.

Additionally or alternatively, the swirling airflow may be also achieved by providing the swirl chamber having a polygonal cross-section having a minimum of 3 sides, preferably 5 sides, more preferably 8 sides, most preferably 9 sides or more.

By providing cells shaped to induce a swirling airflow within the chamber, overall dwell-time of air within the cell increases, thereby increasing moisture extraction efficiency by enabling the walls of the cell to collect a greater amount of moisture from the air before it exits the chamber. The swirling interrupts any linear flow of air through the cells of the assembly, and forces air to remain for longer in each extraction cell.

Furthermore, by encouraging circulation of air within the cell, the single internal surface of the cell may be re-used multiple times in collecting, extracting or separating water. Air to surface contact time is thus increased without the need to provide a greater number of additional contact surfaces (for example by providing a greater number of cells) which may necessitate an increase in the outer dimensions of the device and/or its cost, bulk, weight or manufacturing expense or complexity.

Furthermore, in examples, one or more internal surfaces of the swirl chamber may be provided having a plurality of small recesses and/or protrusions, thereby increasing the total internal surface area of the swirl chamber, and further maximising air to surface contact time.

The described shape of the cells naturally encourages or induces high air speed over the internal surface(s) of the cell, and multiple journeys passing over the surface(s). The high air speed in, for example, a substantially circular motion (as in the case for instance of cells having at least one circular or elliptical cross-section) also exerts centrifugal forces on the air, which, as described above, naturally leads to separation of (heavier) moisture particles from lighter air.

Additionally, the swirling motion in the chamber may induce a more tortuous airflow which also contributes to moisture separation, through for example promoting coalescence of moisture particles which are more readily separated. In some examples, the shape of the cell may even introduce turbulent motion within the cell, further acting to enhance moisture separation.

Each air inlet and each air outlet of the at least one cell may comprise a fluid passageway extending from an outer surface of the assembled unitary bodies to at least one of the cells, and/or the cells of each air flow path may be interconnected by fluid passageways.

In one or more examples, at least one of the fluid passageways may be arranged in a direction which is substantially tangential to a cell with which it is connected. In one or more examples for instance, the passageway may be tangential to the internal wall of a cell to which it is connected, in particular to the internal wall (or portion of the internal wall) which the passageway meets as it enters the cell.

In more particular examples, at least one of the cells may have at least one inlet passageway arranged tangentially to induce a swirling air flow in a first rotational direction when inside the cell, and at least one outlet passageway arranged tangentially so as to receive a swirling air flow in a second rotational direction.

The effect of this is that air is substantially unable to exit the chamber while swirling in the direction in which it entered. The air is only able to exit the chamber once its direction is changed so as to coincide with the orientation of the outlet passageway. The pressure forces pulling the air generally in the direction of the outlet of the extraction assembly will naturally act to bring this about. However, this reverse configuration of inlet and outlet orientations ensures that the swirling airflow induced within the chamber does indeed delay exit of the air from the chamber, for at least as long as the swirling has enough momentum to overcome the outlet-directed pressure forces.

In particular examples, the second rotational direction may be opposite to the first rotational direction.

According to one or more examples, at least the inlet fluid passageway may have a maximum cross-sectional area of 4 $\mu mm^2$, preferably 2 $\mu mm^2$, more preferably $\mu mm^2$, most preferably 0.25 $\mu mm^2$. A narrower cross-sectional area of the fluid passageway naturally induces a more accelerated air-flow into the cell, and therefore a more rapid motion of air within the swirl chamber. Such rapid air-flow promotes efficient moisture extraction, through inducing air to pass over the internal surfaces multiple times, and also by increasing centrifugal forces which, as noted above, further promotes separation of moisture and other contaminants.

Furthermore, according to one or more examples, the at least one cell of the cellular structure may be provided with a plurality of inlet passageways and/or a plurality of outlet passageways. One or both of the pluralities of passageways may each be adapted to collectively provide a certain minimum total passageway cross-sectional area (one or both pluralities may each provide a minimum aggregate cross-sectional area). The minimal total cross-sectional area may for instance be 0.25 $\mu mm^2$, preferably $\mu mm^2$, more preferably 2 $\mu mm^2$, most preferably 4 $\mu mm^2$. By providing a plurality of relatively narrower passageways, but which collectively provide a certain minimal cross-sectional area, the speed of the air flowing into a respective swirl-chamber may be increased without diminishing the overall flow-rate (volume per unit time) into and/or out of the chamber.

In accordance with one or more of the above examples, each of the inlet and/or outlet passageways may be provided having a certain minimum length, so as to ensure the operability of the passageway as an air-directing means and/or an air accelerating means as described in the examples above. In particular, one or more of the passageways may be provided having a minimum length of 2 mm, preferably, 4 mm, more preferably 6 mm, most preferably 8 mm.

It is anticipated that in accordance with at least a subset of embodiments, the above-described swirl-chamber cells may be provided in combination with embodiments of one or more of the other primary aspects of the invention described above. In particular, it is anticipated that such cells could be advantageously incorporated within one or more embodiments of the first primary aspect of the invention. The particular structure of the extraction assembly of the first primary aspect lends itself particularly well to the straightforward provision of cells having the configuration provided by the present aspect of the invention. In particular, curved or rounded cells may be much simpler to fabricate where they are constructed from an assembly of multiple recessed components.

According, in one or more embodiments of the present aspect, the assembly may be a moisture extraction assembly according to any of the moisture extraction assembly embodiments described above (in relation to either the first or second primary aspect of the invention).

Furthermore, according to a final aspect of the invention, there may be provided a moisture extractor in accordance with any of the moisture extractor embodiments described above, comprising a moisture extraction assembly which is consistent both with embodiments of the present (third) primary aspect and also one or more embodiments of the first primary aspect of the invention.

BRIEF DESCRIPTION OF THE DRAWINGS

Examples of the invention will now be described in detail with reference to the accompanying drawings, in which:

FIG. 14 schematically depicts a variation on the example moisture extraction assembly of FIG. 11;

FIG. 15 schematically depicts a perspective view of an exterior of the example moisture extraction assembly of FIG. 11;

DETAILED DESCRIPTION OF THE EMBODIMENTS

The invention is based on provision of a moisture extraction assembly for removing moisture from compressed air. The assembly is formed of two or more unitary bodies which assemble in facing relationship to define a cellular network structure of variously connected cells which collectively define one or more air flow paths extending between at least one inlet and at least one outlet.

Figure 1:
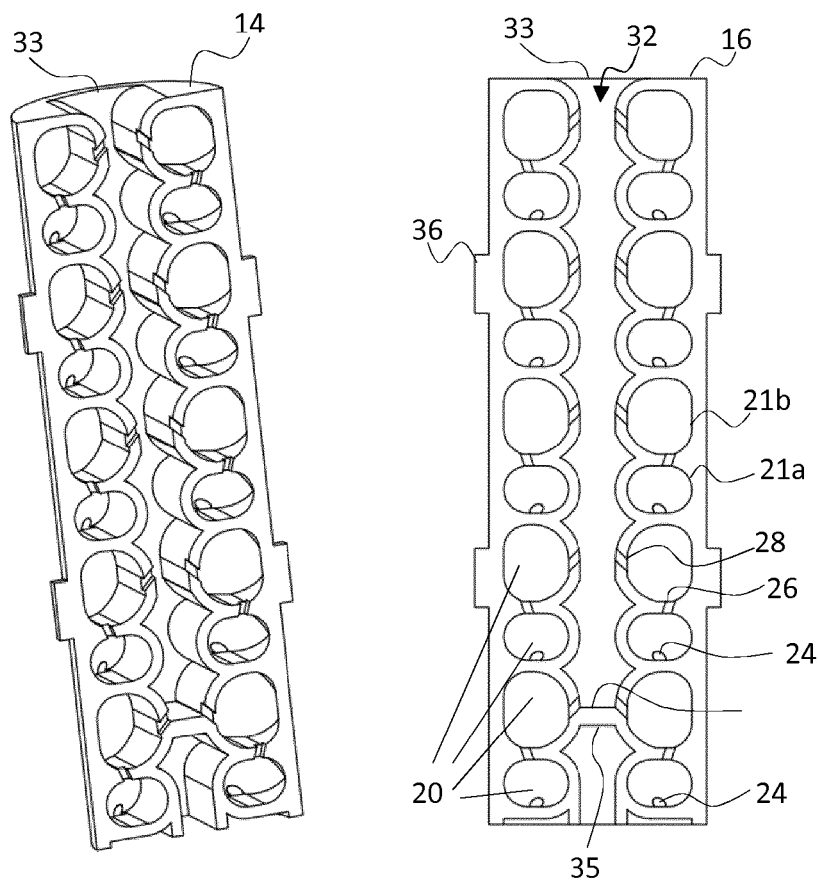
FIG. 1 schematically depicts an exploded view of an example moisture extraction assembly in accordance with an embodiment of the invention.
Figure 2:
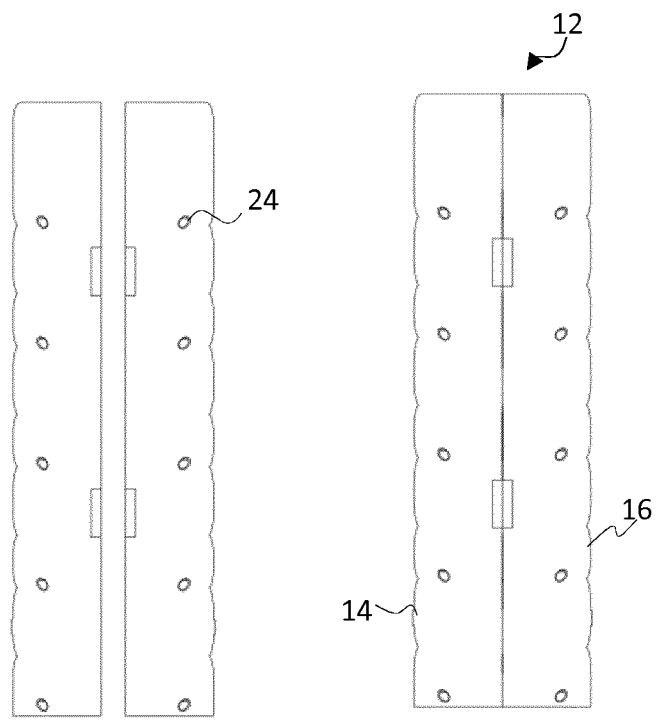
FIG. 2 schematically depicts a perspective view of example moisture extraction assembly of FIG. 1.

FIGS. 1 and 2 schematically illustrate a first example moisture extraction assembly 12 in accordance with one or more embodiments of the present invention. FIG. 1 depicts an exploded view of the example moisture extraction assembly and FIG. 2 depicts a side view of the assembled moisture extraction assembly.

The moisture extraction assembly 12 is comprised of first 14 and second 16 unitary bodies, each having a formed planar surface and which, as shown in FIG. 2, are configured to fit together in facing relationship to close the structure and to define a cellular network of variously connected cells. Each of the first and second unitary bodies delimits a plurality recesses 20 formed into a substantially planar surface, these recesses defining in each body two axially-aligned columns of substantially rounded recesses (recesses having a round cross-section in at least one direction), the two columns arranged either side of a central channel-shaped recess which extends along the majority of the length of the body. The recesses of each body are configured to come together upon assembly of the structure to define a plurality of cells 20, the cells together forming the cellular network or cellular structure of variously connected cells.

Since the recesses become the cells upon assembly, for ease of reference and of description, in the paragraphs which follow, both the recesses and the cells are labelled in the provided drawings with the same reference numeral, 20.

In the example embodiment illustrated by FIG. 1, the recesses 20 of each of bodies 14 and 16 are arranged and configured to spatially align and dimensionally correspond when the two open surfaces are brought together in facing relationship. Each pair of respectively matching recesses of the two bodies thus come together form a single united cell 20, one half of this cell being delimited by one of each of the two bodies. Each cell in this example is thus jointly delimited by a combination of the recesses of the two bodies.

As noted above, the assembled bodies 14, 16 together define a cellular network or cellular structure of variously interconnected cells 20. In particular, as shown in FIG. 1, the recesses (and hence the corresponding cells in the assembled structure) comprise a 3D array of respectively interconnected pairs of cells, each pair thus forming a series chain of two interconnected cells. In particular, the pairs of interconnected cells are arranged in axially aligned stacks or columns, one stack or column being provided on either side of a central exit channel 32.

An example series chain of two interconnected cells 21a and 21b is indicated by way of example in FIG. 1. Each chain of interconnected cells defines a respective air flow path which extends between a respective inlet 24 provided in first cell 21a, through a fluid passageway 26, into second cell 21b, and out via a second fluid passageway 28 into a central common exit channel 32. The respective inlets 24 supplying the first cell 21a of each of the chains of interconnected cells each extend from the first cell 21a to an exterior surface of the assembled structure. This can be seen in FIG. 2 which shows the plurality of inlets 24 as they appear at the exterior surface of the assembly.

The fluid passageways interconnecting cells in accordance with this example comprise small notches formed into the tops of dividing walls of the cells. The notches each define a fluid channel through which air may pass from the respective cell to the respective next cell (or to the common exit channel 32).

It is to be noted that in the example of FIG. 1, upon assembly of the structure, each cell is formed of the marriage of two recesses, one comprised by each of the unitary bodies. Hence in this example, each cell is in fact provided with two inlets, one inlet being formed into each recess. For the sake of brevity however, in the descriptions which follow reference will be made to a single inlet, but it is to be understood that this may refer to an arrangement of two (or even more than two, for example three or four or more) inlets, each providing part of the air supply which feeds into the single air-flow path delimited by the respective chain of cells.

As described, each chain of cells 21a, 21b is fluidly connected to a common central exit channel 32. The channel is connected to a single outlet 33, through which all air passing through the structure subsequently exits. At the base of the channel is a blocking wall 35 which prevents the outlet 33 from making direct fluid connection with the exterior environment, which would result in a bypassing of the air-flow paths provided through the interconnected cells 20 of the structure.

Air entering the structure through one of the plurality of inlets 24 passes through into a respective chain of interconnected cells, within which it makes high-speed contact with the interior walls of the cells. The air-flow within an example connected pair of cells, 21a and 21b, is illustrated schematically in FIG. 3. The ovular cross-sectional shape of the cell 21a encourages or induces air entering the cell through inlet 24 to follow a rotational or swirling motion inside the cell. This high-speed spinning of the air inside the cell increases contact time of the air with the cell walls, since the air makes contact with the same interior surface multiple times as it circulates around. As noted in preceding sections, rotation of the air also induces separation of moisture and other contaminants through the exertion of centrifugal forces which force the heavier moisture particles against walls of the chamber where they can be collected and from which they may drain away under the influence of gravity.

Air passing through the first cell 21a into the second cell 21b, is again induced through the similarly curved profile of cell 21b to follow a swirling motion, again promoting moisture extraction. Moisture extracted from the water in either of the cells may collect on the walls of the cells, from which it can then drain downwards, through the fluid passageway connecting the cells, and out through the air inlet 24.

Referring again to FIG. 1, air exits the second cell 21b via fluid passageway 28 and out into central exit channel 32. Here, more moisture may be collected from the air as it flows past the internal surfaces of the channel. Any moisture collected by these surfaces naturally drips or flows downwards along the surface of the walls under the force of gravity. Upon meeting one of the fluid passageways 28 lining the channel, the moisture is induced to flow down into the second cell 21b of the chain of cells to which the passageway belongs, through the interconnecting passageway 26 into first cell 21a, and then finally out of the cellular structure via air inlet 24.

Each of the two unitary bodies of the example of FIGS. 1 and 2 define a substantially semi-circular outer cross-section or profile, with the assembled bodies together defining a substantially circular (or elliptical) outer cross-section or profile and a substantially cylindrical 3D form. Such a shape is not essential to the invention however.

Figure 4:
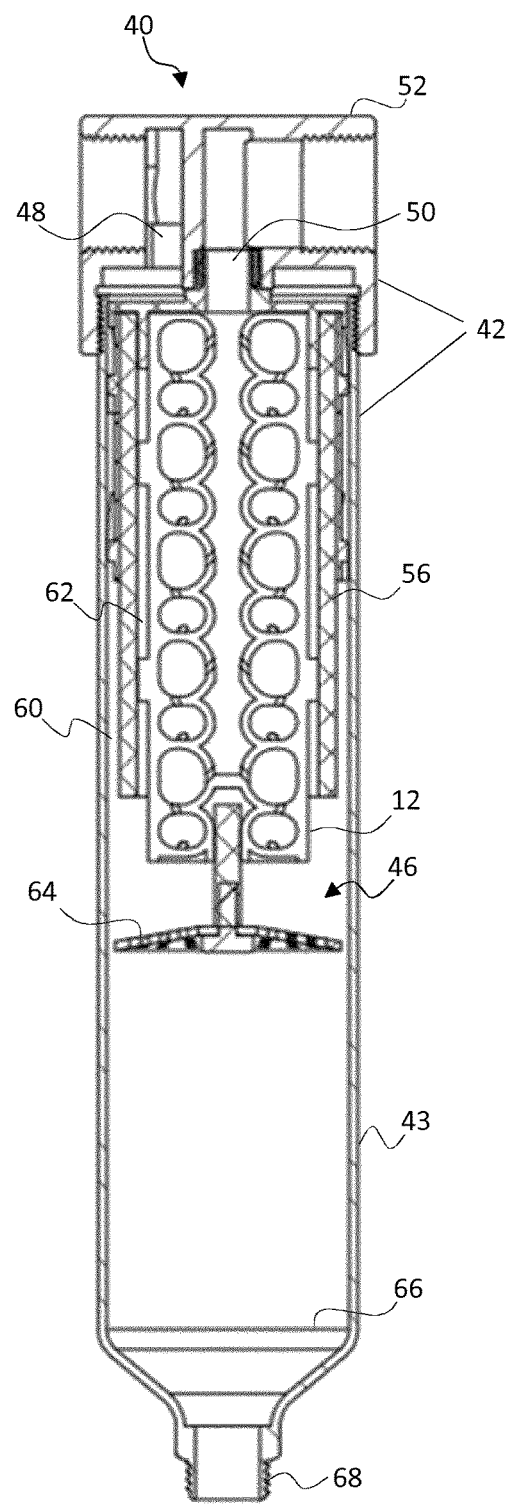
FIG. 4 schematically depicts a cross-sectional view of an example moisture extractor in accordance with an embodiment of the invention.
Figure 5:
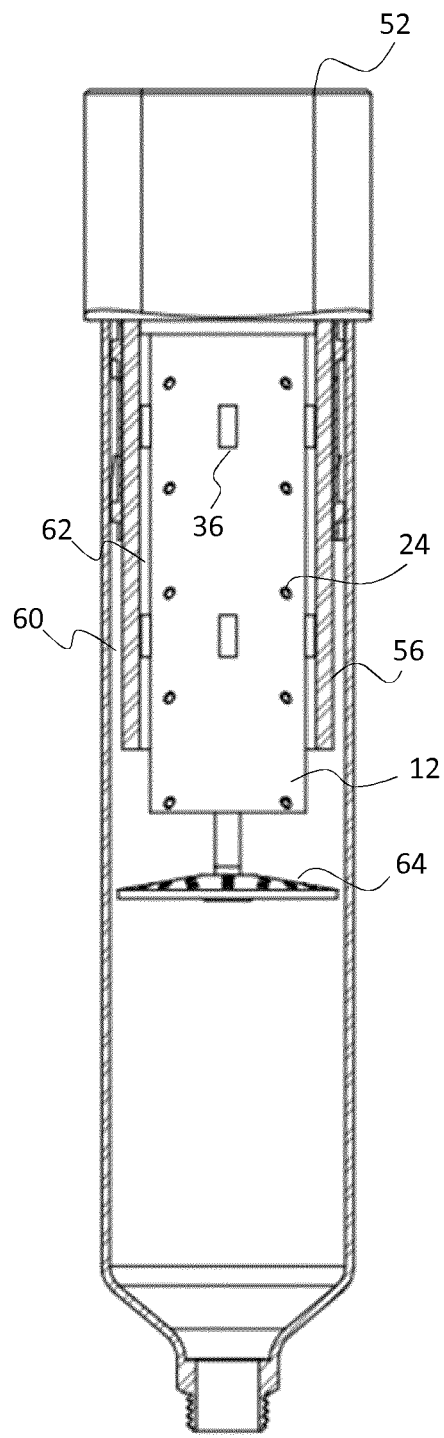
FIG. 5 schematically depicts a second cross-sectional view of the example moisture extractor of FIG. 4.
Figure 6:
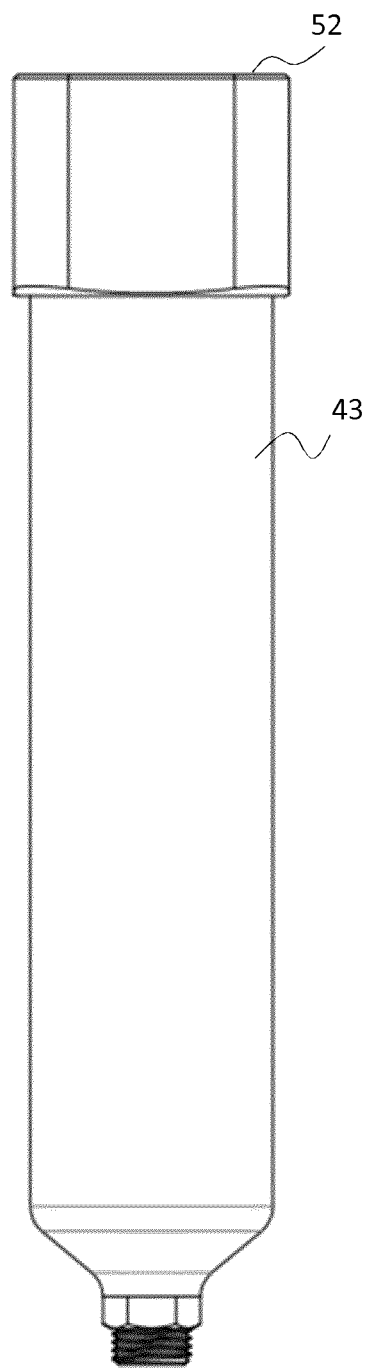
FIG. 6 schematically depicts a perspective view of the example moisture extractor of FIG. 4.

FIGS. 4 to 6 show the extraction assembly 12 of FIGS. 1 and 2, as assembled and arranged within an example moisture extractor 40 in accordance with one or more embodiments of the invention. FIG. 4 shows a sectional view through the example moisture extractor 40 including a sectional view through the moisture extraction assembly arranged within. FIG. 5 shows a sectional view through the extractor, which shows a side view of the exterior of the moisture extraction assembly 12 as arranged within the extractor. FIG. 6 shows an exterior side view of the moisture extractor.

The extractor comprises a housing 42, being formed of a tube member 43 and a cover member 52, the cover member being arranged to cover a first end of the tube member. The housing defines a chamber 46, the chamber being provided with an inlet 48, and an outlet 50, the inlet and outlet being formed within the cover member 52. The moisture extraction assembly 12 is attached to the cover member 52, arranged coaxially with the tube member, and outlet 33 of the central exit channel 32 fluidly connects with moisture extractor outlet 50.

As shown in FIG. 4, and more clearly in FIG. 5, the assembled moisture extraction assembly in accordance with the present example further comprises a securing means in the form of a sleeve 56 which extends around the assembled unitary bodies 14, 16. Spacer members 36 (visible also in FIGS. 1 and 2) extend between the sleeve and the assembled unitary bodies and act to maintain an air space between the sleeve 56 and the assembled bodies, to prevent occlusion of any of the extraction assembly inlets 24.

The sleeve 56 is attached to the cover member 52 and divides a top portion of the chamber 46 into an outer annular channel 60 and an inner axial channel 62, the moisture extraction assembly being located within the inner axial channel.

Air entering the moisture extractor through the inlet 48 is directed into outer annular channel 60, through which it travels axially downwards, making contact with the interior surface of the tube member 43 and the exterior surface of the sleeve 56 as it passes. The air then passes into the lower region of the chamber 46 where it may, depending upon the air pressure and flow path, be baffled by baffle member 64, and redirected axially upwards in the direction of the lower end of axial channel 62. The air then passes into the axial channel where it may be received by air inlets 24 of the moisture extraction assembly 12. The air may then pass through the moisture extraction assembly in the manner described above with reference to FIGS. 1-3, passing into central exit channel 32, from which it may exit from the moisture extractor through outlet 50, to which the outlet 33 of the moisture extraction assembly is fluidly coupled.

At the base of the tube member 43 is further provided a drain element 66, which is adapted to collect or catch any moisture or other contaminants falling down through the chamber 46 which have been extracted from the compressed air, and to expel them from the chamber. As discussed above, the cells of the cellular structure of moisture extraction assembly 12 are arranged such that water extracted from air passing through the structure may flow down through the interconnected cells of the chamber and out through the air inlets. This water may then drip or flow down through axial channel 62, and eventually down into the drain element 66 to be expelled from the chamber.

The drain element 66 may typically be fluidly connected with a one-way drain unit, coupled to connector cap 68, and acting to allow passage of water out from the chamber 46, while maintaining air pressure within the chamber unchanged. Such one-way drain units comprising one-way drain valves are routine components in the present art, and will be well known and understood by the skilled person.

FIG. 6 shows a perspective view of the exterior of the example moisture extractor shown in FIGS. 4 and 5. This shows the exterior of the housing, including the exterior of tube member 43 and of cover member 52.

Although in the examples described above, the moisture extraction assembly 12 is provided with a securing means in the forming of a sleeve 56, in other examples other securing means may alternatively be employed or provided. These might include, by way of example only, removable fastening means such as screws, bolts or pins, adhesive fasteners such as glue, or may even include sealing or fusing means, such as welding.

Figure 3:
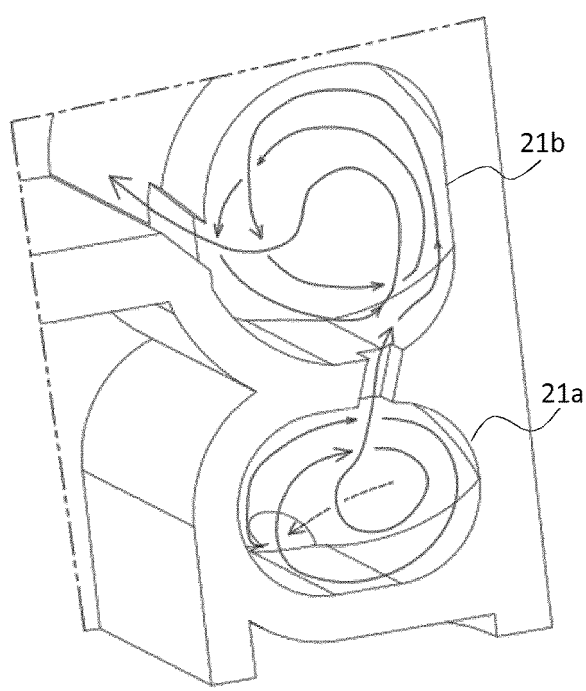
FIG. 3 schematically illustrates the airflow through sample cells of an example moisture extraction assembly.

Furthermore, the particular configuration of cells of the cellular network provided in the example extraction assembly of FIGS. 1-3, represents just one example of a configuration which is achievable in accordance with the concept of the present invention. In accordance with other examples, there may be provided for instance a greater number of individual series chains of interconnected cells, thereby providing a greater number of air flow paths through the structure. This may improve water extraction efficiency for example. Additionally or alternatively there may be provided in accordance with one or more examples, longer series interconnected chains of cells, comprising for example 3 cells, or four cells or five cells or more than five cells.

In accordance with one or more examples, a different spatial arrangement of cells may be provided within the cellular structure. Although in the example of FIGS. 1-3, the cellular structure comprises parallel columns of cells, axially aligned with a central exit channel 32, in other examples, cells may be arranged differently, for example following a substantially helical or spiral pattern around the interior of the assembled structure. The cells may be arranged in axially separated lines or blocks of cells for example, rather than radially separated columns.

The central exit channel may also be reconfigured in alternative examples, for example by providing a channel which is curved or twisted. Such a form may enable more complex or sophisticated patterns of cells to be achieved, while still maintaining the same basic air flow path configuration provided by the example of FIGS. 1-3 (a single exit channel with multiple air inlets). Alternatively, a different air flow configuration may be provided in one or more examples. There may be provided multiple outlets for example, and/or there may be provided multiple exit channels leading to an exterior surface of the device. There may be provided one or more exit channels arranged on or around an exterior surface of the device. This might enable a greater number of cells to be provided within the bulk of the assembly itself for instance. A greater number of cells may improve moisture removal efficiency of the assembly.

Providing a greater number of overall cells in the structure (either through providing longer cell chains or a greater number of chains) may be achieved in accordance with one or more examples by expanding the dimensions of the assembly 12 or alternatively by reducing the volume of each individual cell. Reduction of the cell volumes may however offset at least part of any increase in moisture extraction efficiency achieved by providing a greater number of cells.

Alternatively, a greater number of cells might be possible in some examples, without either reducing the size of the cells or increasing the outer dimensions of the assembly, by employing an alternative spatial arrangement of cells which might realise greater spatial efficiency. For example, employing cells having a different cross-sectional shape (for example rectangular, triangular, hexagonal, or any other polygonal shape), better tessellation of cells may be achievable, thereby making more efficient use of space.

A different cross-sectional shape of the overall assembly may be provided in accordance with further examples, for example a rectangular cross-section, or triangular or hexagonal cross-section.

The three-dimensional form of the cells may in other examples be altered. For example, it may be desirable in some cases to provide torus shaped cells which extend 360 degrees around the central channel 32, or other three-dimensional forms.

Figure 7:
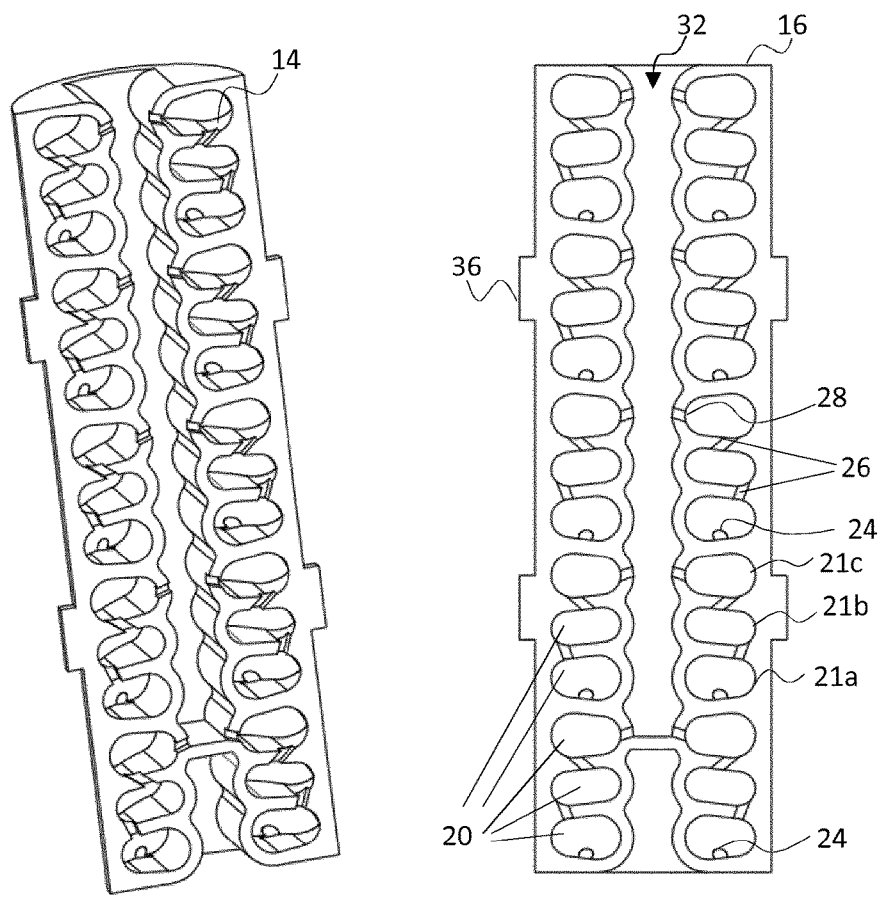
FIG. 7 schematically depicts an exploded view of a further example moisture extraction assembly in accordance with an embodiment of the invention.

In FIG. 7 is schematically depicted an exploded view of a second example moisture extraction assembly in accordance with one or more embodiments of the present invention. This example illustrates one alternative configuration of cells which may be achieved in accordance with the invention. In particular, this example employs stacked series chains of three interconnected cells, as opposed to the chains of two cells provided in the example of FIGS. 1-3. The assembly is however in all other respects similar to the example extraction assembly example of FIGS. 1-3.

As in the example of FIGS. 1-3, the cellular structure of FIG. 7 comprises two columns, each comprising five interconnected chains of cells. Since a greater number of cells are provided in each chain however, this is achieved either through extending the dimensions of the assembly axially, or by reducing the size of each cell.

A greater number of cells in each chain may increase moisture extraction efficiency, since the extra cell(s) provide an extra stage of extraction above than which was previously provided. However, longer series chains of cells may also incur a greater pressure drop across the assembly, and consequently also a reduced flow rate of air through the structure. However, where greater moisture extraction efficiency is of primary concern, such arrangements may be preferable.

An example chain of three interconnected cells in accordance with this embodiment is indicated in FIG. 7 by cells 21a, 21b and 21c. The first cell 21a is provided with an inlet 24, and is connected with second cell 21b via a first fluid passageway 26. The second cell is likewise connected to the third cell 21c via a second fluid passageway 26, the third cell being fluidly connected to the common central exit channel 32.

Figure 8:
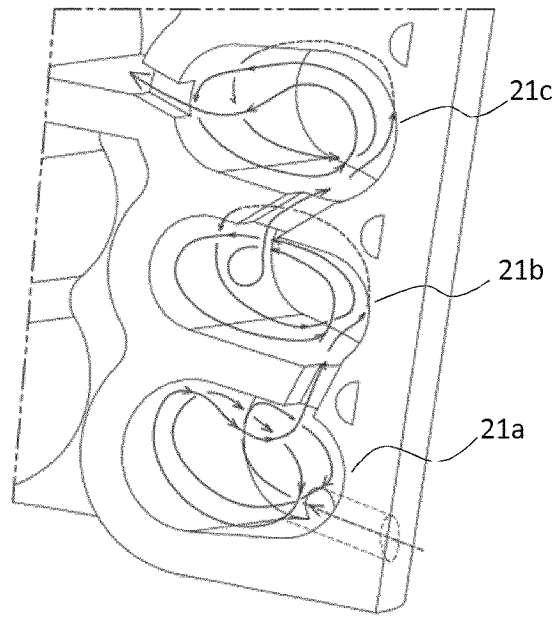
FIG. 8 schematically illustrates the airflow through sample cells of the example moisture extraction assembly of FIG. 7.

The airflow through an example chain of three cells 21a, 21b, 21c is schematically illustrated in FIG. 8. As in the example chain of two cells, each cell has a substantially rounded cross section which encourages air to follow a swirling or rotational path once inside the cell. The rotational or swirling motion encourages coalescence of moisture droplets and also separation of moisture towards the walls of the chamber. It also increases the dwell time of the air inside the chamber, by interrupting any otherwise direct exit of the air through a respective fluid passageway.

Figure 9:
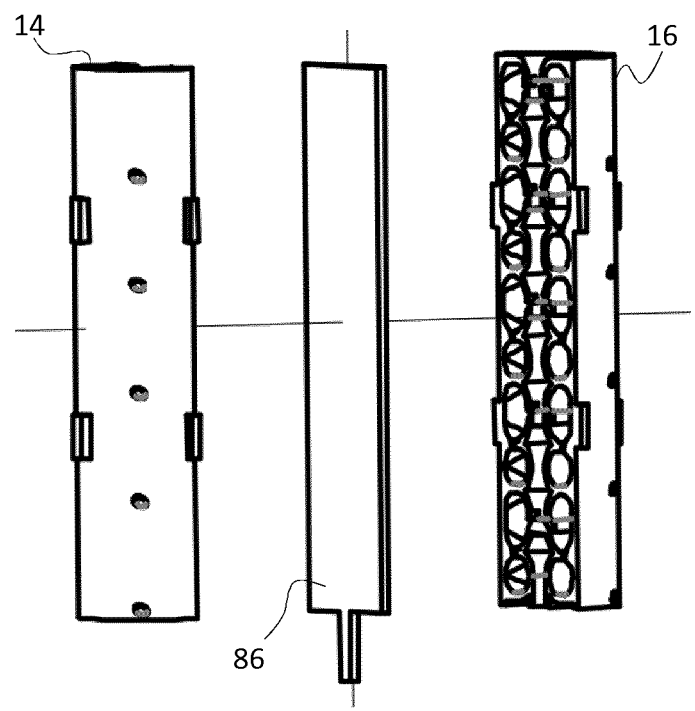
FIG. 9 schematically depicts a further example moisture extraction assembly in accordance with an embodiment of the invention.

One simple means of increasing the number of cells provided by the extraction assembly without significantly altering the structure of the cellular network is to provide a planar forming plate or baffle member interposed between the facing surfaces of the assembled unitary bodies. An example of such an arrangement is schematically illustrated in FIG. 9. Upon assembly of the (in this case two) unitary bodies 14, 16, a planar forming plate 86 is placed interposed between the two, such that when the surfaces are brought together, the forming plate 86 blocks or isolates the recesses 20 of the first member from those of the second. As a result, each recess of each unitary body defines, in the assembled structure, its own separate cell, with the forming plate 86 defining one wall of the cell and the respective recess defining the other.

Such an arrangement doubles the number of cells within the structure (and doubles the number of air flow paths), but at the cost of halving the size of each cell.

Maximal extraction efficiency of the moisture extraction assembly requires that extracted water be expelled from the assembly as rapidly and efficiently as possible. Build ups of liquid within the assembly may cause blockages of cells or passageways, may exert undesirable drag forces on passing air, or may block or impede one or more internal surfaces, therefore reducing overall air-surface contact time.

Figure 10:
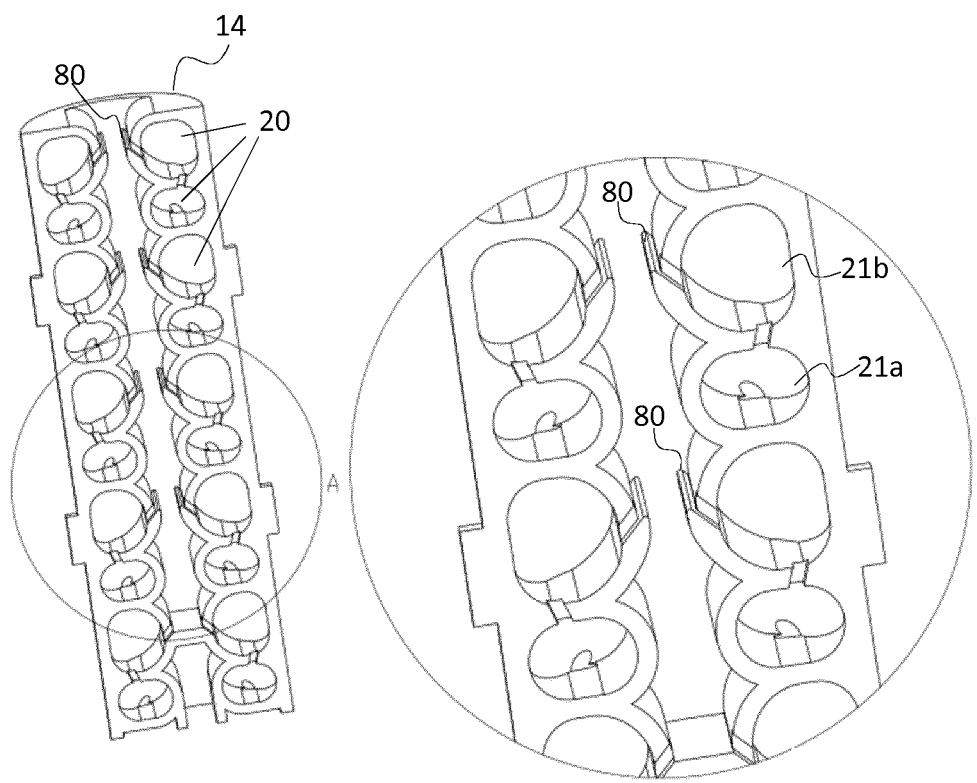
FIG. 10 schematically depicts a further example moisture extraction assembly in accordance with an embodiment of the invention.

As shown in FIG. 10, in accordance with one or more examples of the invention, the branch passageways fluidly connecting the end of each chain of cells with the central exit channel 32 may each comprise a lower lip portion 80 which protrudes part way into the channel 32. The protruding lip portion 80 is shaped and arranged to catch any moisture running along the wall of the axially aligned passageway 32 and direct it to flow down into an end cell of respective chain of interconnected cells (in this case cell 21b). From here, it may then drain down through the cells of the chain and out through inlet 24.

By providing such protruding lip portions, moisture running down the walls of the central channel 32 is prevented from simply running past the fluid passageways lining the channel, and continuing to the bottom of the channel. This would result in almost all of the extracted liquid being drained from the assembly through the bottom-most chain of cells only. This may overwhelm the cells, leading to a blockage of the air-flow path defined by them and possibly also a build-up of water at the base of the channel. The lip portions 80 ensure that draining liquid is distributed substantially evenly across the multiple chains of cells.

Figure 11:
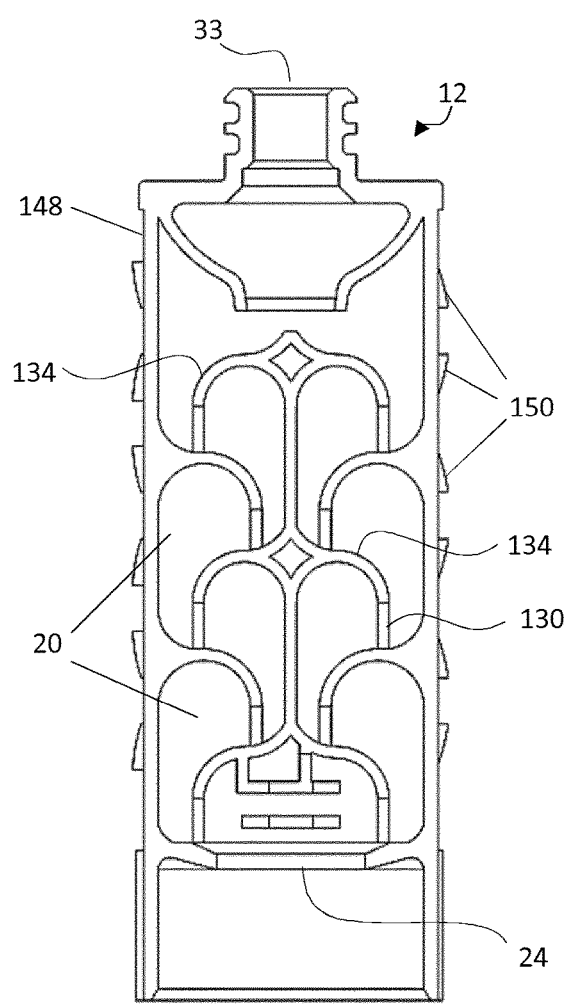
FIG. 11 schematically depicts a further example moisture extraction assembly in accordance with an embodiment of the invention.
Figure 12:
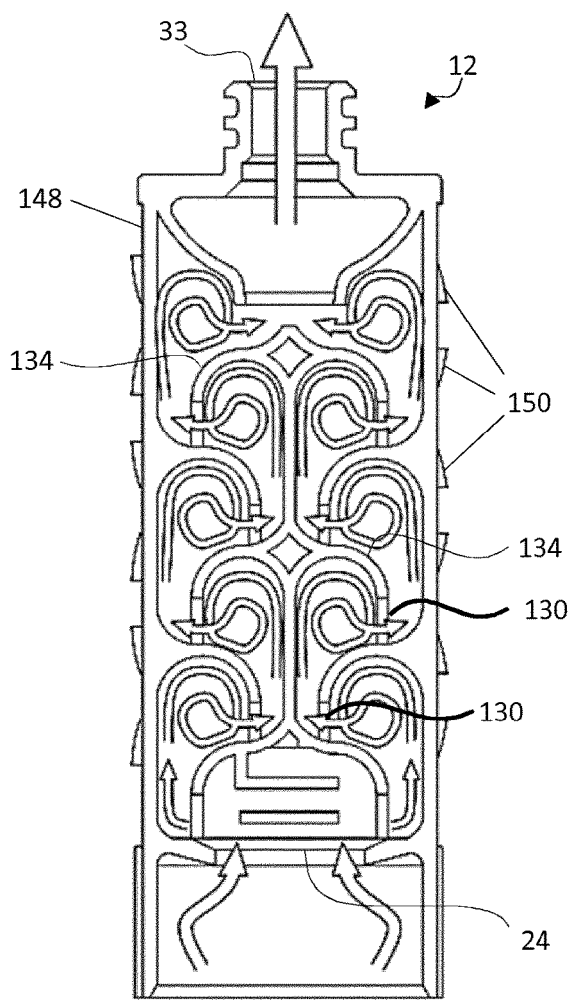
FIG. 12 schematically depicts air flow through the example moisture extraction assembly of FIG. 11.
Figure 13:
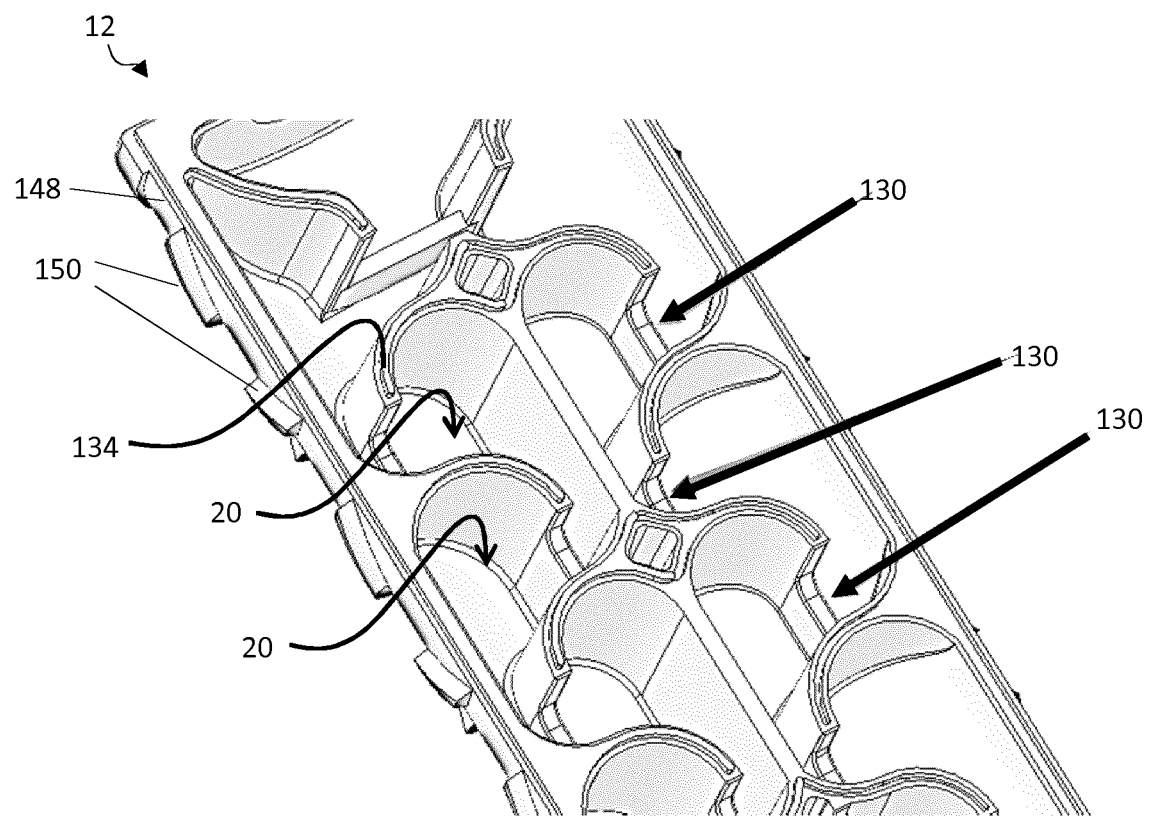
FIG. 13 schematically depicts a perspective view of cells of a portion of the moisture extraction assembly of FIG. 11.

FIGS. 11 to 15 schematically depict a further example moisture extraction assembly 12 in accordance with one or more embodiments of the invention. FIG. 11 shows a sectional view through the assembly, FIG. 12 illustrates the air flow through the assembly, and FIG. 13 shows a perspective view of the cells of a portion of the assembly, illustrating the fluid passageways in more detail. FIG. 14 shows a slight variation on the example of FIGS. 11 to 13, but still in accordance with the general concept embodied by this example. FIG. 15 shows an exterior of one portion of the example extraction assembly of FIGS. 11 to 13.

This example differs from previous examples in comprising only two parallel air flow paths, each extending from a common air inlet 24 to a common air outlet 33. Each parallel air flow path comprises a series chain of effectively five interconnected cells 20. As shown more clearly in FIG. 13, the cells in each chain are interconnected via lowered sections 130 formed in dividing walls 134 separating neighbouring cells 20. These lowered sections form fluid passageways through which air or gas may pass.

As in all examples, the cells 20 are each delimited by at least one of the plurality of recesses formed in the unitary bodies 14, 16 (See FIGS. 1 and 2 for example). These recesses, as shown in FIG. 11, form a structure of internal dividing walls 134 which delimit the cells 20 of the cellular network. In the present example, the dividing walls of each cell are curved or arcuate in such a way as to encourage or induce a certain air flow through the assembly. This is illustrated more clearly in FIG. 12.

In particular, the walls 134 of the cells are curved in such a way as to guide air from one cell obliquely onto an internal wall of the next cell. As shown in FIG. 12, this generally encourages a swirling air flow in each cell 20 which increases contact time between the air and each cell wall. Increased contact time leads to greater extraction efficiency. The swirling motion also induces more tortuous air flow, encouraging inter-particle collisions within the air, which leads to greater coagulation of moisture particles, and therefore also greater moisture extraction.

The partial height walls 130 forming the fluid passageways also encourage more tortuous flow of air through the structure. As air passes over each of the lower wall sections, the wall interacts with the air to cause it to undergo a more circuitous or tortuous flow path (for instance at least partially in a direction toward a floor of the cell, i.e. in toward the page from the perspective of FIG. 12).

Although in the particular example illustrated, the fluid passageways are formed by partial-height wall sections 130, in further anticipated examples, the cells 20 may be freely interconnected, with the passageways formed by discontinuities (i.e. complete breaks or gaps) in the dividing walls between neighbouring cells. With reference to FIG. 13, in such examples, the partial height wall sections 130 would effectively be removed altogether, leaving a gap between each pair of neighbouring cells. Alternatively, the partial height wall might extend only part way between the dividing wall of one cell and the wall of the neighbouring cell. This is illustrated schematically in FIG. 14 which shows an example arrangement in which the fluid passageways are formed by discontinuities 140 in the dividing walls, with partial walls 136 extending part-way across each passage between cells 20.

As is visible in FIGS. 11 to 13, the exterior wall 148 of the extraction assembly comprises a plurality of annular arrays of vanes 150. This is shown more clearly in FIG. 15 which shows the exterior wall of one of the unitary bodies which assemble to form the full moisture extraction assembly 12. These vanes encourage tortuous flow of air about the exterior of the moisture extraction assembly when said assembly is for instance fitted within an interior chamber of a moisture extractor (in a similar manner as described above with reference to FIGS. 4 to 6). This tortuous air flow increases moisture extraction efficiency of such a moisture extractor. This element of the moisture extraction assembly of FIGS. 11 to 15 will be described in greater detail below.

The above described embodiments and examples relate substantially to a moisture extraction assembly configured to provide efficient moisture extraction through provision of a cellular structure of variously connected cells. In accordance with at least one aspect of the invention however, there may be provided a moisture extractor having a housing defining a chamber, wherein the chamber is provided with one or more means to promote moisture extraction of compressed air while the air resides inside the chamber.

Figure 16:
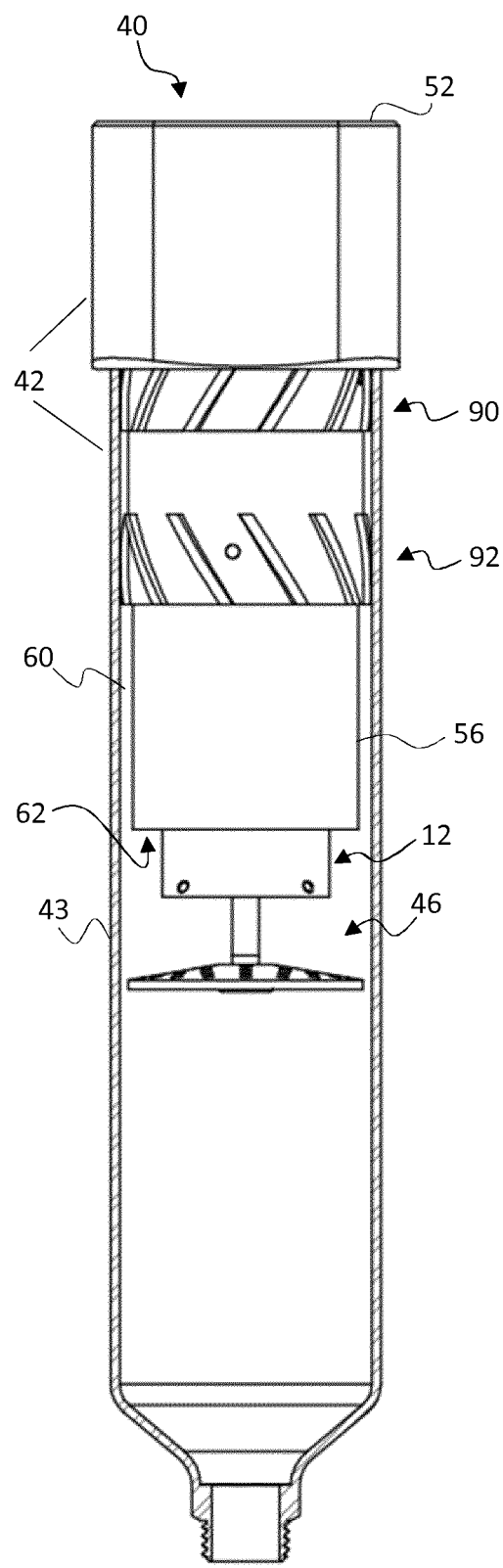
FIG. 16 schematically depicts a further example moisture extractor in accordance with an embodiment of the invention.
Figure 17:
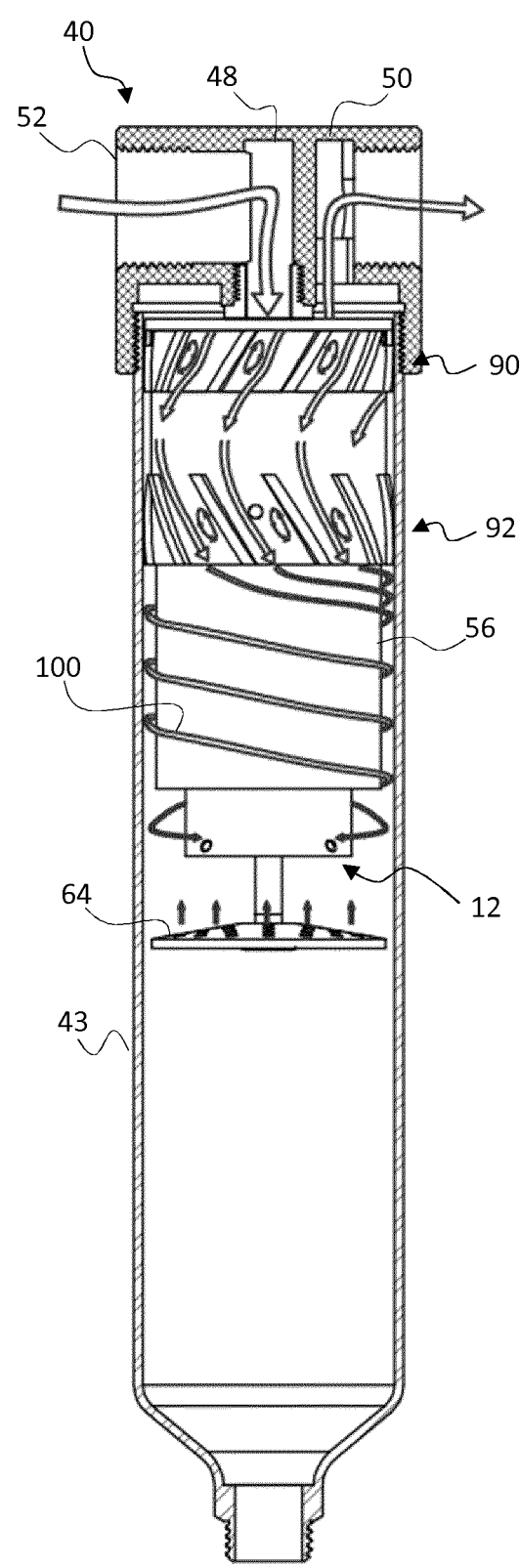
FIG. 17 schematically illustrates the airflow within the example moisture extractor of FIG. 16.

An example of a moisture extractor in accordance with this and/or any other aspect of the presently claimed invention is schematically illustrated in FIGS. 16 and 17. The moisture extractor 40 comprises a housing 42 defining a chamber 46, the housing being formed of a tube member 43 and a cover member 52 arranged to cover a first end of the tube member, the cover having an inlet 48 and an outlet 50 (visible in FIG. 17).

A sleeve 56 is mounted to the cover member 52, and extends into the chamber coaxially with the tube member. The sleeve acts as a baffle, dividing an upper portion of the chamber into an outer annular air flow region 60 and inner axial air flow region 62. For the purposes of the present example, these shall be referred to as outer annular channel 60 and inner axial channel 62. Within the inner axial channel is arranged a moisture extraction assembly 12, in accordance with any of the embodiments described above for example. The inlet 48 formed in cover member 52 is fluidly connected with outer annular chamber 60, while the outlet 52 is fluidly connected with the outlet 33 of the moisture extraction assembly.

As shown in FIGS. 16 and 17, the outer annular channel 60 is provided with two annular arrays of air-directing vanes, a first 90 annular array of vanes arranged at the top of the tube member 43, directly adjacent to the cover member 52 and the inlet 48 and a second 92 annular array of vanes arranged axially displaced from, and in fluid series with, the first.

As illustrated in FIG. 17, the first annular array of vanes 90 is shaped to direct air into a first helical path around sleeve member 56, in a clockwise direction of rotation (as viewed from above). The second array of vanes 92, arranged in fluid series with the first, is shaped to re-direct the received clockwise rotating air into a second helical path having an opposing (anticlockwise, as viewed from above) direction of rotation. The air then continues along the second, anti-clockwise helical path, circulating around sleeve member 56 as indicated by air flow lines 100. The air may continue to circulate until it is baffled by baffle member 64, and re-directed upwards into inner axial chamber 62, where it may be received by the inlets of the moisture extraction assembly 12.

Figure 18:
FIG. 18 shows a simulation air-flow diagram for the example moisture extractor of FIG. 17.
Figure 19:
FIG. 19 shows a further simulation air-flow diagram for the example moisture extractor of FIG. 17.

FIGS. 18 and 19 show air-flow simulations which illustrate the air flow induced within the chamber 46 by the two sets of air-guiding vanes 90, 92. FIG. 18 shows the air flow through the vanes 90, 92 themselves. It can be seen that the air approaches the first set of vanes travelling in a substantially axial or vertical direction. This is visible too in FIG. 19 which shows the air-flow through the length of the chamber 46. Air exits the inlet 48 along a set of substantially parallel axial or vertical paths exhibiting little or no circulation.

Upon meeting the first set of vanes 90, the air is re-directed in a clockwise direction (as seen from above). The second set of vanes 92 is positioned within this re-directed clockwise path, such that the air is naturally directed toward the second array of vanes, where the shape of the vanes has the effect of re-directing the air once again, steering it around into a substantially anti-clockwise direction (as seen from above). As shown in FIG. 19, the air then continues to circulate around the interior of the channel until baffle member 64 is reached, at which point a major part of the air is re-directed upwards or simply pulled upwards by vacuum pressure forces into the extraction assembly 12 above.

The effect of the second set of vanes 92, as discussed in preceding sections, is induce a high acceleration of the air (as it turns), with this acceleration greatly contributing to the separation of heavier moisture particles from lighter air. The subsequent circulation 100 of the air around the chamber also assists in the separation of water by exertion of centrifugal forces, and also by increasing air-surface contact time, through slowing the passage of the air through the chamber, and keeping a maximal amount of air pressed against the internal walls of the housing through centrifugal forces.

Figure 20:
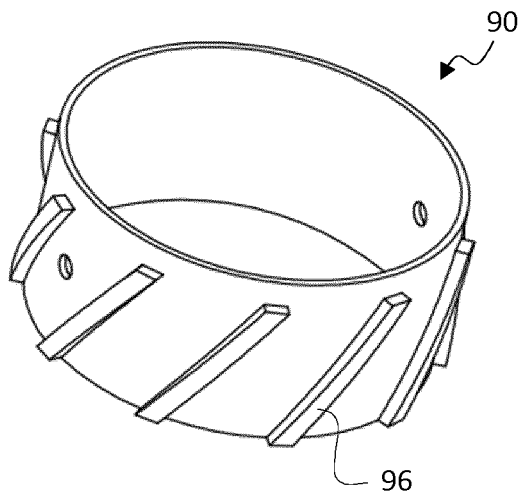
FIG. 20 schematically illustrates a first view of an example array of vanes for directing airflow.
Figure 21:
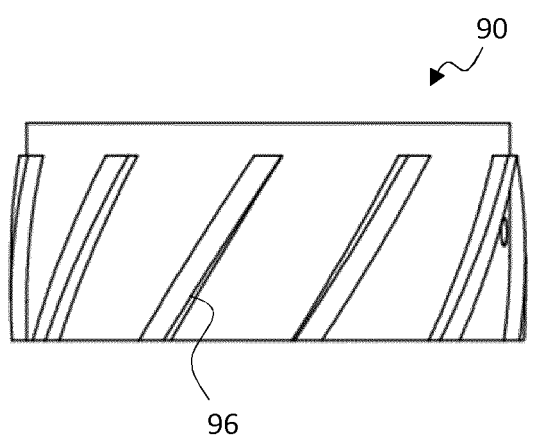
FIG. 21 schematically illustrates a second view of an example array of vanes for directing airflow.

Two perspective views of the first annular array of vanes are shown by way of example in FIGS. 20 and 21. The array comprises a circumferentially distributed set of elongate bar or wall members 96, which are arranged at a non-zero angle, and each member substantially parallel with a neighbouring member.

The vanes illustrated in FIGS. 20 and 21 are substantially cuboidal in shape. However, in other examples, differently shaped vanes may be employed, for example having rounded, curved or otherwise shaped profiles. The vanes could comprise or consist of air-directing blades for example. It is further noted that although the word 'vanes' is used throughout this description, the term is to be interpreted broadly as encompassing any variety of fin, blade, slat or strip, or any other element or member configured to direct or channel air in a similar manner to that shown and described above.

Figure 22:
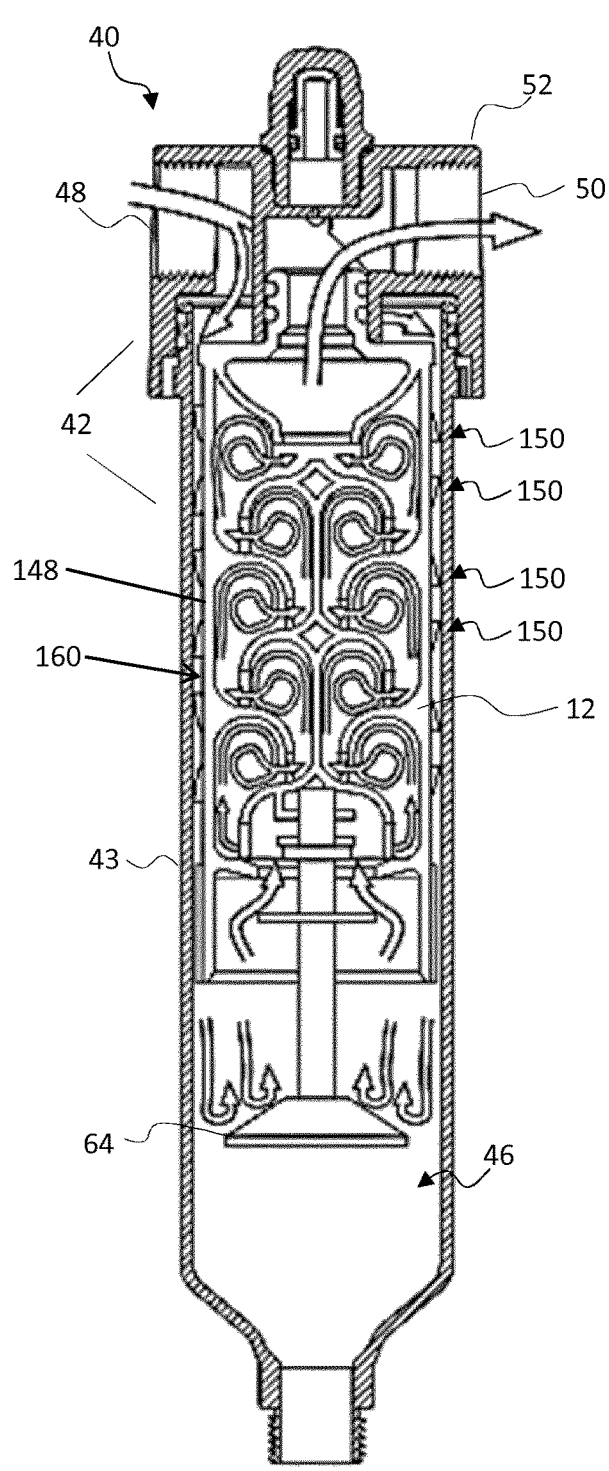
FIG. 22 schematically illustrates a further example moisture extractor in accordance with an embodiment of the invention.

A further example of a moisture extractor 40 in accordance with one or more embodiments, having vanes to promote tortuous air flow is shown in FIG. 22. As in the previous examples, this moisture extractor comprises a housing 42 defining a chamber 46, the housing being formed of a tube member 43 and a cover member 52 arranged to cover a first end of the tube member, the cover having an inlet 48 and an outlet 50.

The moisture extractor of FIG. 22 differs from the previous example in comprising in particular a moisture extraction assembly in accordance with the example of FIGS. 11 to 13 and FIG. 15 described above. This moisture extraction assembly comprises a plurality of arrays of vanes 150 for encouraging tortuous air flow about the moisture extraction assembly.

The moisture extraction assembly 12 is arranged in the chamber 46 of the housing 42 in such a way that the vanes 150 extend from an outer peripheral wall 148 of the assembly to meet an interior surface of the tube member 43. The outer wall 148 of the extraction assembly 12 effectively serves as a baffle which defines, between the assembly wall 148 and the tube member 43, an outer annular air flow region 160 through which air flows from the inlet 48 of the moisture extractor 40 to a lower region of the chamber 46. The interior of the moisture extraction assembly (the interconnected network of cells) effectively defines an inner axial air flow region, through which air flows from the lower region of the chamber 43 to the outlet 50 of housing.

Figure 23:
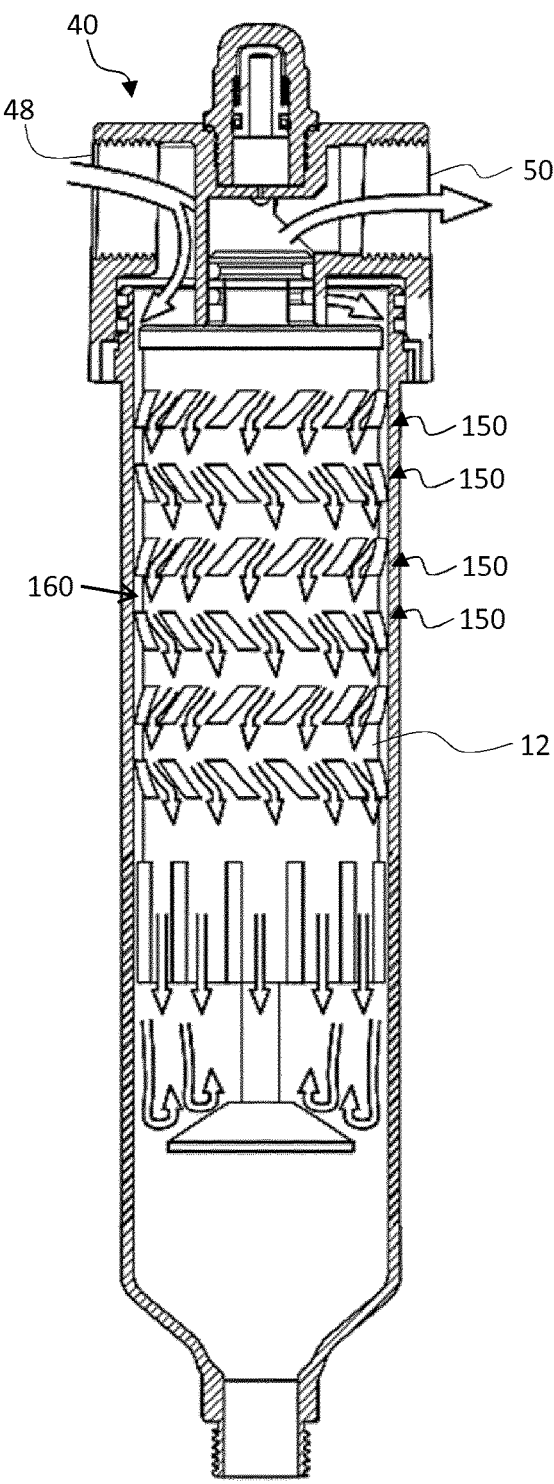
FIG. 23 schematically depicts air flow through the moisture extractor of FIG. 22.

As air passes through the outer annular air flow region 160, the plurality of arrays of vanes 150 interacts with the air to cause it to undergo tortuous flow. As in the example described above, each successive array of vanes is counter-directional with respect to the preceding array. The air flow direction is hence reversed by each successive array from clockwise to counter-clockwise (or vice versa) and so on. This resulting air flow behaviour is substantially similar to that described in relation to the previous example. However, further to the previous example, the example of FIG. 22 comprises multiple pairs of counter-directional vanes arranged in series. The tortuous air flow effect is hence enhanced in the present case. This is illustrated schematically in FIG. 23 which shows the air flow through the outer annular air flow region and through the arrays of vanes 50 extending across it.

Figure 24:
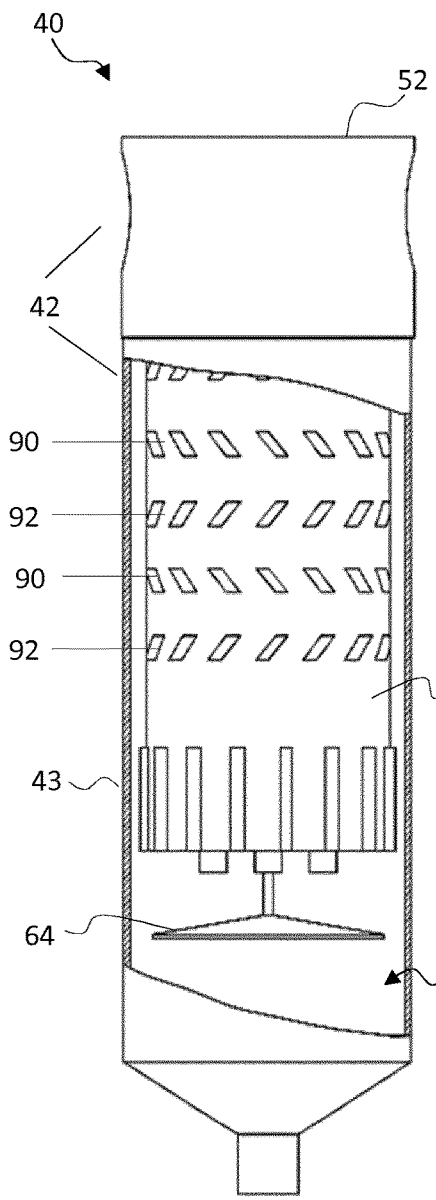
FIG. 24 schematically depicts a sectional view through a further example moisture extractor in accordance with an embodiment of the invention.
Figure 25:
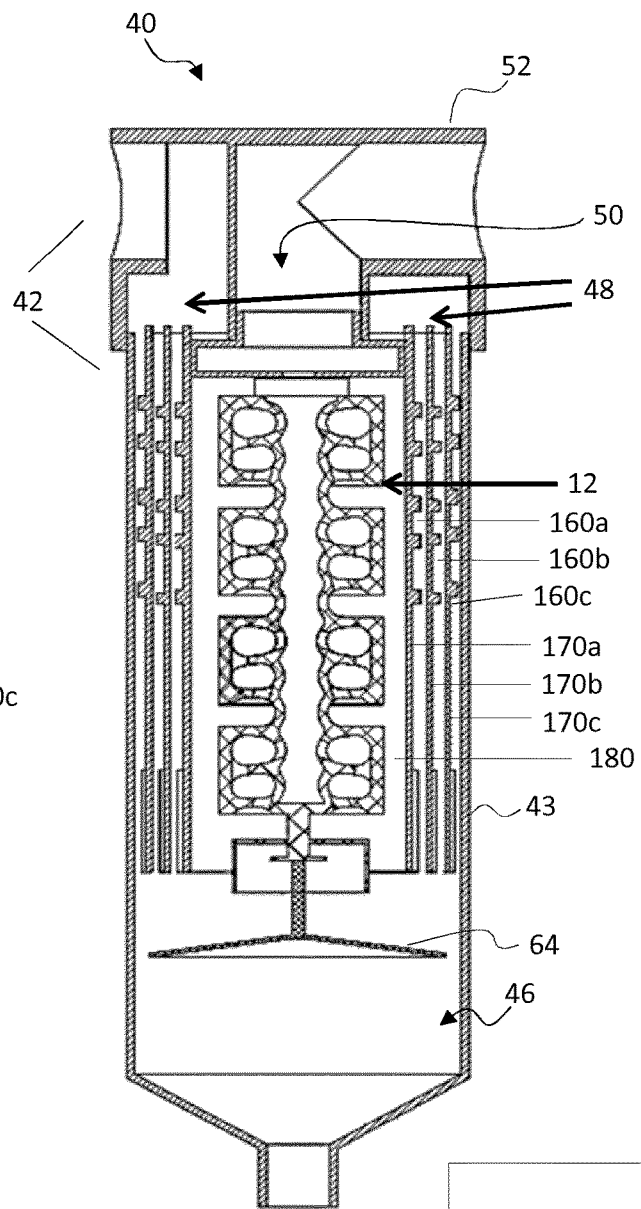
FIG. 25 schematically depicts a further sectional view through the example moisture extractor of FIG. 24.
Figure 26:
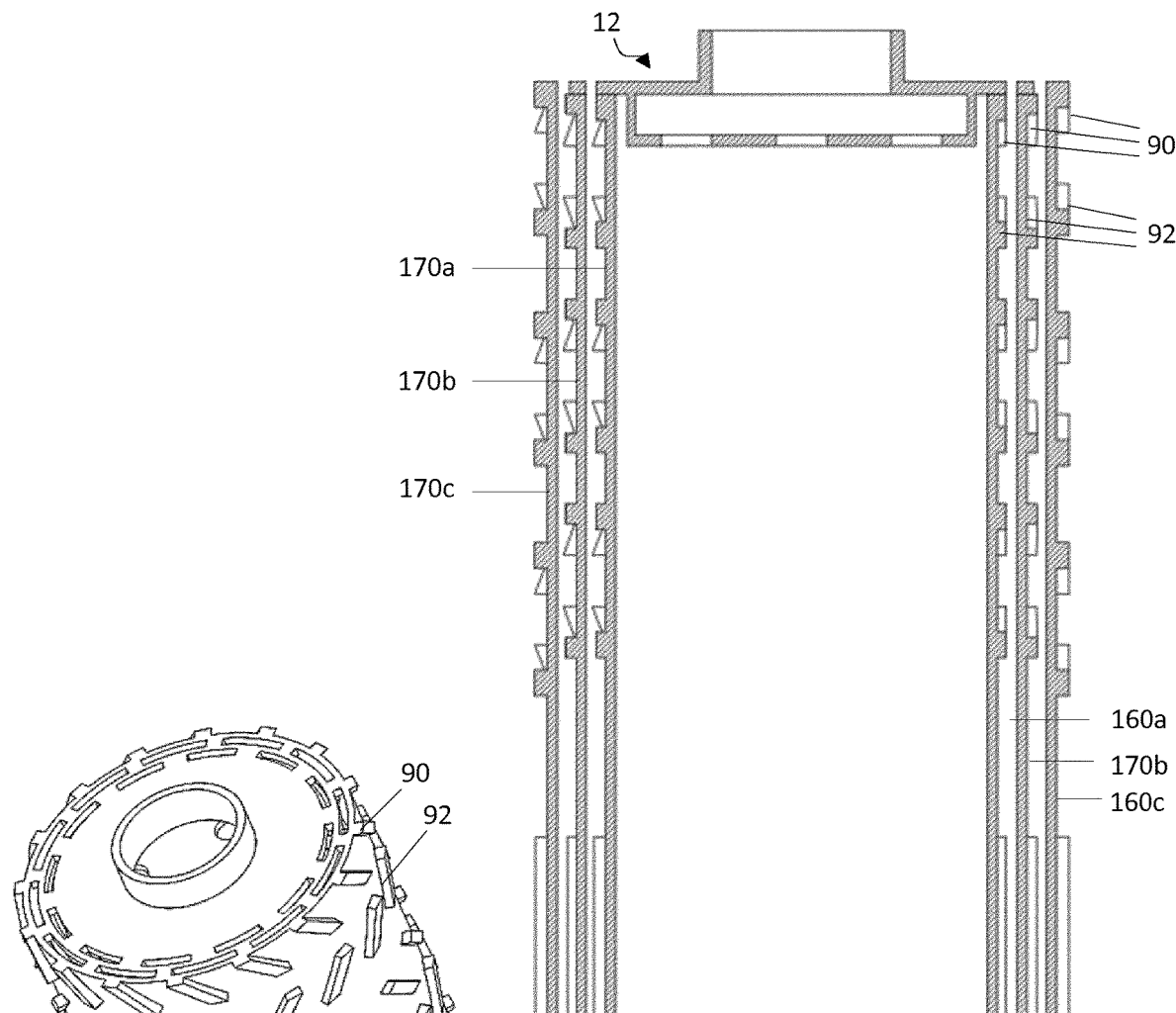
FIG. 26 schematically depicts a further view through components of the example moisture extractor of FIG. 24.
Figure 27:
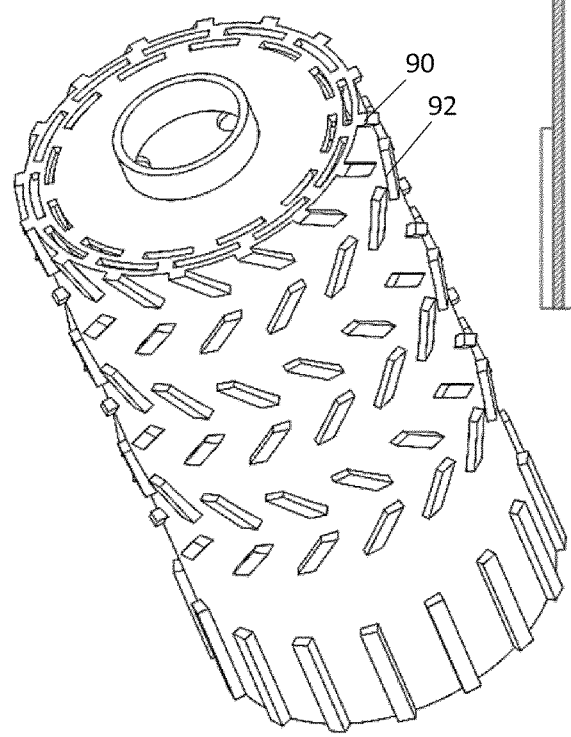
FIG. 27 schematically depicts a perspective view of components of the example moisture extractor of FIG. 24.

In accordance with a further set of examples, there may be provided a plurality of sets of vanes arranged in parallel within separate parallel annular air flow regions. An example of such an embodiment is illustrated in FIGS. 24 to 27. FIGS. 24 and 25 show a moisture extractor comprising multiple parallel annular air flow channels, and FIGS. 26 and 27 show the spatial configuration of plural air flow channels in more detail. FIG. 26 shows in particular a closer sectional view through parallel annular baffle members defining the air flow regions, and FIG. 27 shows a perspective view of an exterior of said arrangement of annular baffle members.

The moisture extractor in accordance with this example is substantially similar to previously described examples. The extractor comprises a housing 42 defining a chamber 46, the housing being formed of a tube member 43 and a cover member 52 arranged to cover a first end of the tube member, the cover having an inlet 48 and an outlet 50. A moisture extraction assembly extends from the cover member into the chamber 46 of the housing coaxially with the tube member 43. Also extending from the cover member are a set of three annular baffles 170a, 170b and 170c. The annular baffles divide the chamber 46 into an inner axial air flow region 180 and a set of three concentric outer annular air flow regions 160a, 160b, 160c. Each of the outer annular air flow regions is defined by the annular spacing between respective neighbouring pairs of the three annular baffles 170 and/or the tube member 43.

Each of the annular baffles 170a, 170b, 170c is provided with plural arrays of respectively counter directional air directing vanes 90, 92 for encouraging tortuous flow of air through the annular air flow regions 160a, 160b, 160c.

A moisture extraction assembly 12 is arranged within the inner axial air flow region 180, co-axial with the tube member and the annular baffles 170. The interior of the moisture extraction assembly (i.e. the cellular network) in this case in fact partially defines the axial air flow region, enabling air to flow from a lower part of the chamber 46 to the outlet 50.

By providing plural sets of vanes, each within an independent parallel air flow region 160a, 160b, 160c, the moisture extraction benefits of counter-directional vanes described above in relation to the example of FIGS. 16 to 21 are multiplied. Each annular channel may act concurrently and independently upon a separate portion of the air entering the chamber 46 to encourage separation of moisture (and other contaminants). Thus, greater extraction efficiency may be achieved.

In accordance one or more further examples it is anticipated that an outer peripheral wall of the moisture extraction assembly 12 itself may serve as one of the annular baffles (i.e. playing the role of the inner most annular baffle 170a comprised in the above example). By way of example, the moisture extraction assembly of FIGS. 11 to 15 might be provided within a suitable housing 42 being sized and arranged such as to enable a further one or more annular baffle members, each having respectively counter-directional vane arrays to be arranged between the outer peripheral surface 148 of the assembly and an interior surface of the tube member 43. In such an arrangement, a plurality of outer annular air flow regions are defined, each with air-directing vanes and wherein the inner-most baffle is served by the outer peripheral surface 148 of the moisture extraction assembly 12.

As discussed above, one means of enhancing extraction efficiency of a moisture extraction assembly such as those described in examples above is to provide cells which are internally shaped so as to encourage or induce swirling or circulating airflow inside the cell. Additionally or alternatively, fluid passageways leading into cells may be angled so as to direct air into the cell along a path designed to ensure maximal circulation or swirling of the air when inside the cell.

Figure 28:
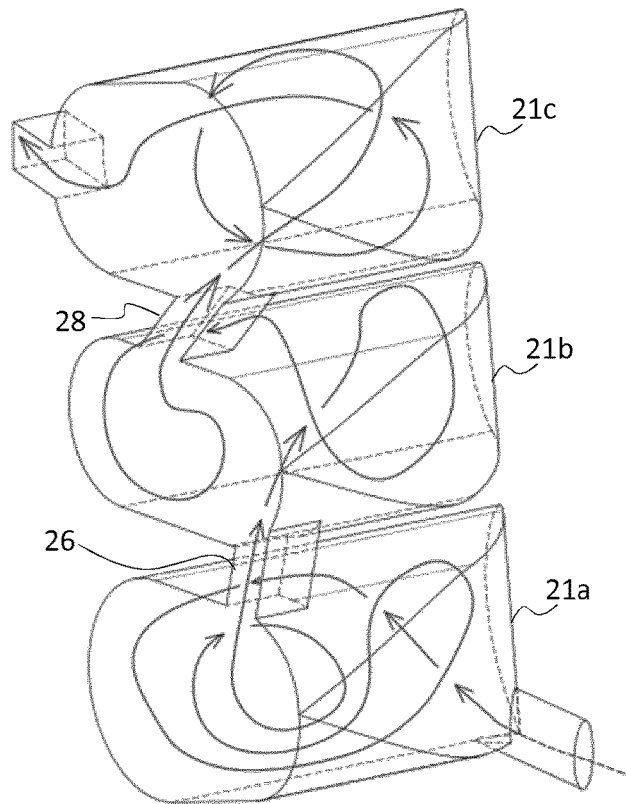
FIG. 28 schematically illustrates airflow within an example set of cells having a first internal shape.
Figure 29:
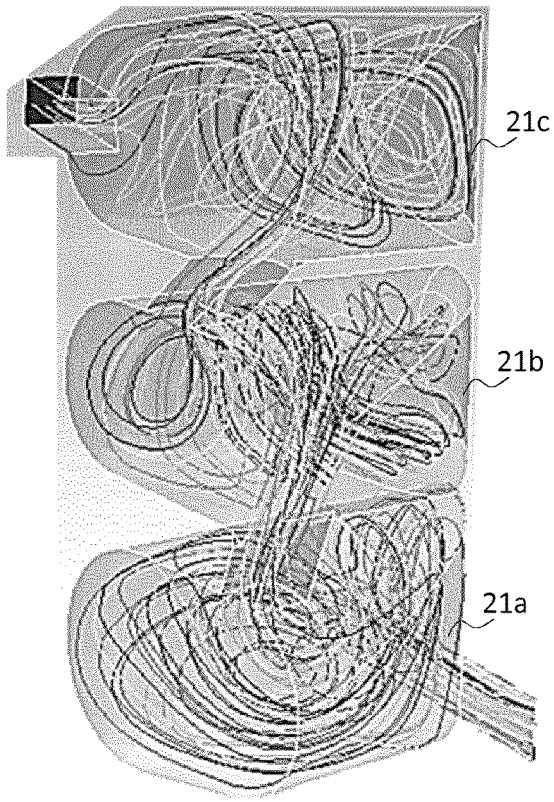
FIG. 29 shows a simulation air-flow diagram for the example set of cells having the first internal shape.

FIGS. 28 and 29 schematically illustrate the airflow through one example chain of three interconnected cells 21a, 21b, 21c. The cells are shaped having a substantially ovular cross-section. As shown in the figures, the ovular cross-section encourages air to flow about the chamber in a rapid, swirling motion, the air following a path which encompasses many multiple rotations and directional variations before exiting the cell. The curved inner profile of the internal surfaces naturally encourages such rapid rotational flow, which improves air-contact surface time and significantly increases extraction efficiency.

Furthermore, interconnecting passageways 26, 28 are angled substantially tangentially with the internal surface to which they make first contact. As a result, air passing into the cell through these passageways is guided into the cell along a path tangential to the surface receiving the air. The air is thus naturally guided around the curved inner profile of the cell, encouraging the air to follow the ovular path of the inner surface, and exhibit corresponding rapid rotational motion about the cell interior. Simulations performed by the applicant indicate that the angling of the passageways in the manner indicated in FIGS. 28 and 29 significantly increases extraction efficiency compared to examples comprising the same ovular chambers but having substantially 'vertical' passageways.

Figure 30:
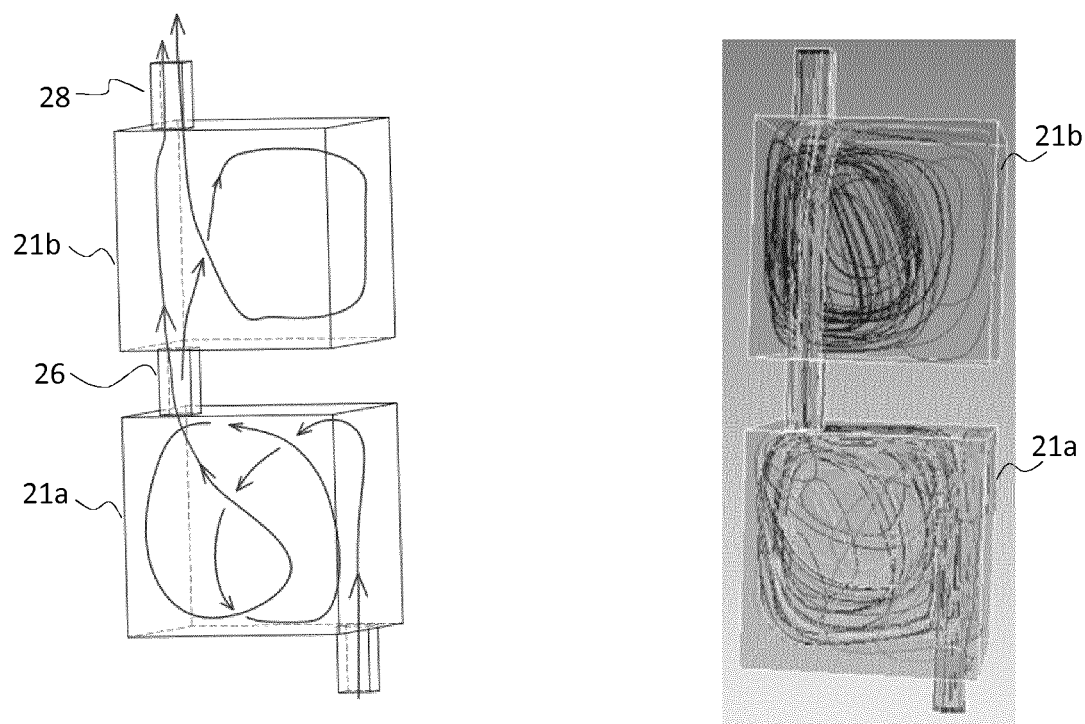
FIG. 30 illustrates the airflow within an example set of cells having a second internal shape.
Figure 31:
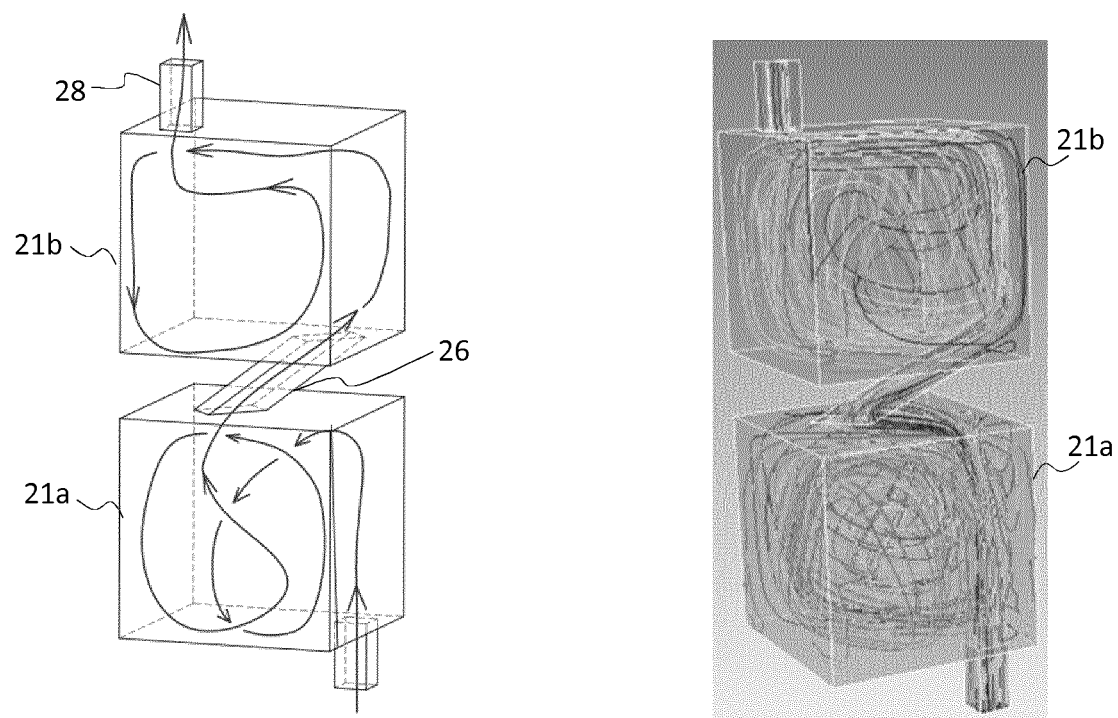
FIG. 31 illustrates the airflow within an example set of cells having a third internal shape.

FIGS. 30 and 31 illustrate the advantageous effect of fluid passageways angled to direct air into a respective cell along a path best suited to inducing swirling, or simply to induce a path which ensures maximal air-surface contact time within the chamber. The figures show each show an interconnected series chain of two substantially cubic cells.

In the example of FIG. 30, fluid passageway 26 between lower cell 21a and upper cell 21b is angled 'vertically' upwards, in direct alignment with the exit passageway 28 of cell 21b, positioned directly above it. As a result, much of the air passing into the chamber escapes straight out through the exit passageway 28, without travelling into the remainder of the cell. Only a portion of the air entering the chamber dwells for any time in the chamber at all, and of that air, only a very small fraction makes any real contact with the internal surfaces of the chamber. This is especially visible in the air flow simulation depicted in the right-hand side image of FIG. 30. Here it can be seen that a large quantity of air flows directly upwards from the interconnecting passageway 26 to the exit passage 28. Of the air that does circulate within the chamber, the vast majority of the air completes a circuit which extends only to a central region within the cell, and does not make substantial contact with the walls of the cell.

By contrast, in the arrangement of FIG. 31, interconnecting passageway 26 is aligned and angled so as to guide air directly into the right hand region of the cell, and at an angle which is such as to induce circulation of the air around the interior walls of the chamber. Furthermore the arrangement of the passageway 26 ensures that air cannot flow directly from the passageway out through exit passage 28. The improved air flow is clearly visible in the simulation diagram shown in the right-hand image of FIG. 31. A major portion of the air circulates around the surfaces of the cell, providing maximal air-surface contact time.

Figure 32:
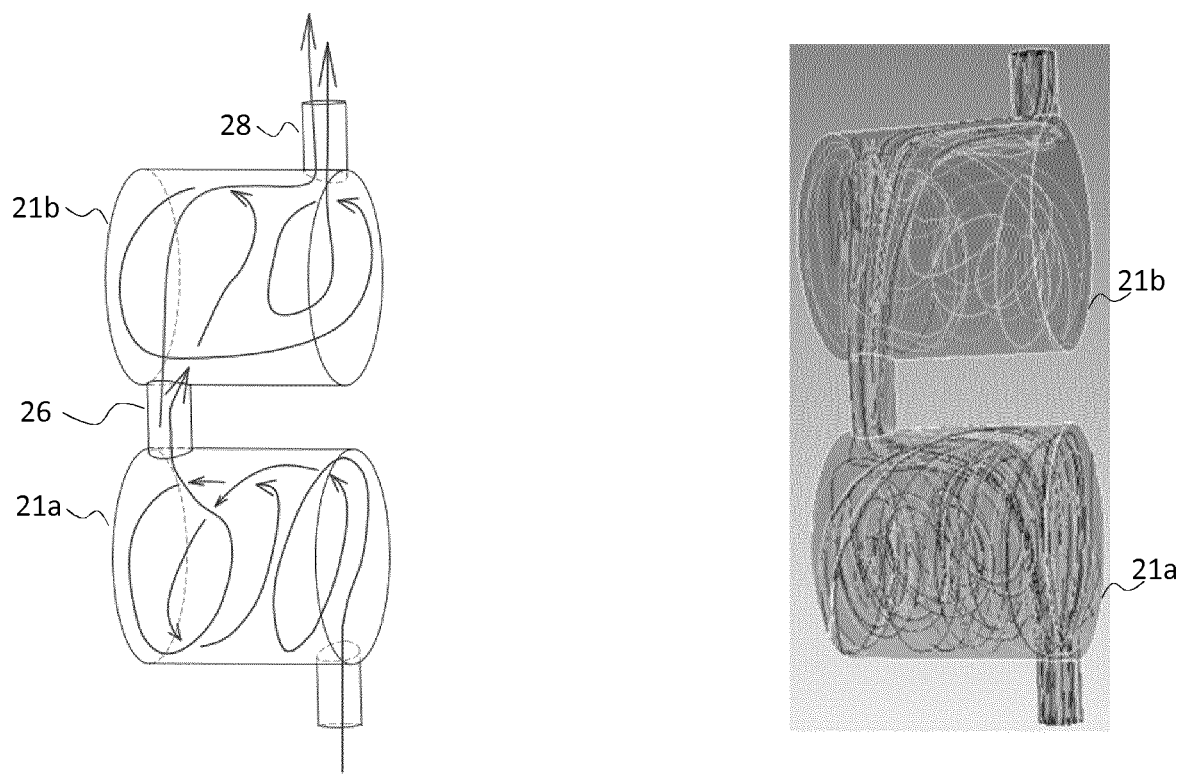
FIG. 32 illustrates the airflow within an example set of cells having a fourth internal shape.
Figure 33:
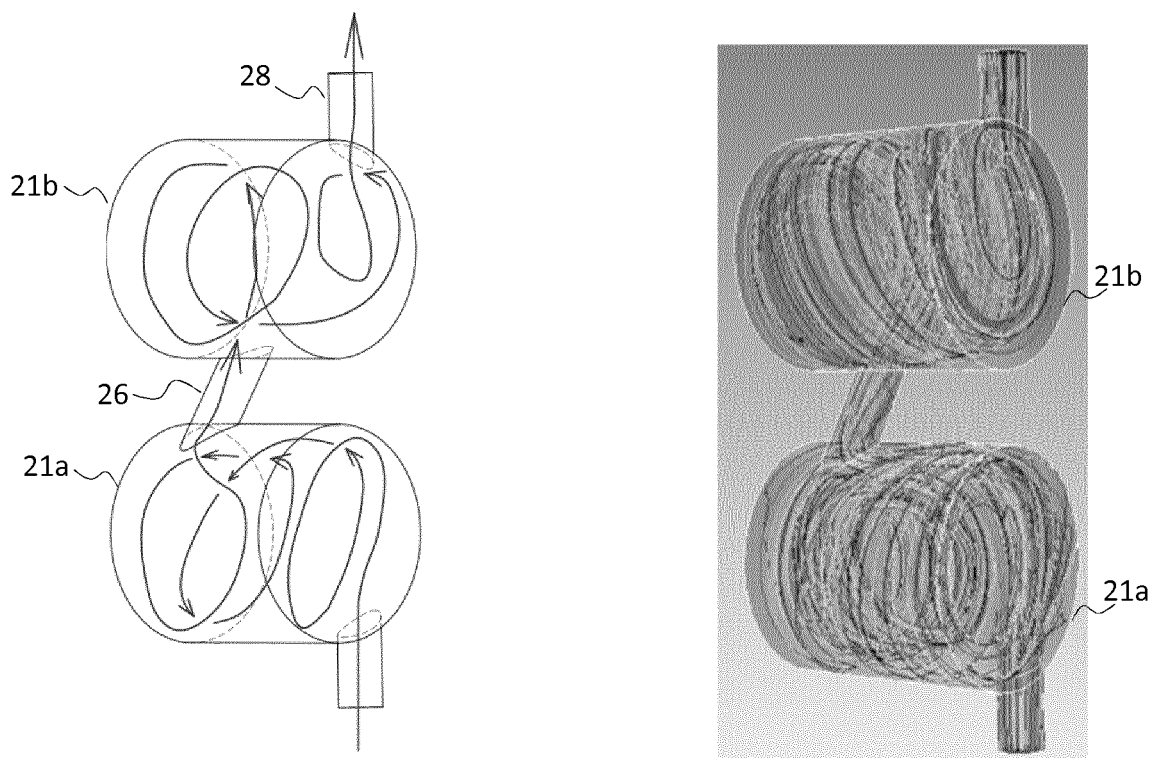
FIG. 33 illustrates the airflow within an example set of cells having a fifth internal shape.

FIGS. 32 and 33 illustrate a similar comparison. The figures each show an interconnected series chain of two substantially cylindrical cells. FIG. 32 shows an arrangement in which interconnecting passageway 26 is aligned at an angled normal to the surface of upper cell 21b, and FIG. 33 shows an arrangement in which the interconnecting passageway is aligned substantially tangentially with the internal surface with which it makes contact once inside the cell.

In the arrangement of FIG. 32, it can be seen, in particular from the air flow simulation, that air entering the upper cell 21b is propelled directly upwards into the cell and onto an upper surface portion of the cell. From there, much of the air is directed 'horizontally' along the upper surface portion and directly out of the cell through exit passage 28. Only a small quantity of the air dwells in the cell for any length of time, and almost none exhibits any circulation around the internal surfaces of the cell.

By contrast, in the arrangement of FIG. 33, the air is directed into the cell at an angle tangential with the surface with which it makes first contact within the cell. The effect of this is that the air is naturally induced to circulate around the cylindrical interior surfaces of the cell, maximising air-surface contact time and hence maximising water extraction efficiency.

The applicant has simulated the performance of a prior art moisture extractor and moisture extractors in accordance with embodiments of the present invention. In particular, a moisture extractor having the structure of the example of FIG. 5 (i.e. without air-directing vanes) and comprising a moisture extraction assembly according to the example of FIG. 7, and a moisture extractor having the structure of FIG. 16 (with vanes), and comprising a moisture extraction assembly according to FIG. 1 were each simulated. The results of the simulation were as follows:

| Device | Water removal efficiency (%) by size of droplet diameter | | | | |
| --- | --- | --- | --- | --- | --- |
| | 10 µm | 4.3 µm | 1 µm | 0.5 µm | 0.1 µm |
| Comparative Example | 100 | 99.999 | 96.97 | 96.22 | 94.84 |
| Example 1 (FIG. 1 + FIG. 11 embodiment)) | 100 | 100 | 100 | 100 | 100 |
| Example 2 (FIG. 5 + FIG. 7 embodiment) | 100 | 100 | 100 | 100 | 100 |

It can be seen from the data that the two moisture extractors according to the invention offer a significant improvement in extraction efficiency. This improvement becomes most pronounced in relation to extraction of smaller droplets. Droplets of diameter of 0.1 µm demonstrate the most significant improvement in extraction efficiency. For this reason, it is apparent from the data that the embodiments according to the invention not only allow improved moisture extraction, but also offer improved extraction of aerosol particles.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A moisture extraction assembly for use in removing moisture from compressed air, the assembly comprising a plurality of unitary bodies, wherein each unitary body has a formed surface in which a plurality of recesses is provided,
wherein the unitary bodies of the plurality of unitary bodies are assembled together with their respective formed surfaces in a facing relationship so as to close the plurality of recesses and thereby define a cellular structure of an interconnected plurality of cells, each cell of the interconnected plurality of cells being defined by at least one recess of the plurality of recesses,
wherein the assembled unitary bodies define at least one air inlet and at least one air outlet of the assembly, the at least one air inlet and the at least one air outlet being in fluid communication with respective different cells of the cellular structure to define at least one air flow path, the at least one air flow path extending from the at least one air inlet to the at least one air outlet via a plurality of cells of the interconnected plurality of cells in series, whereby moisture can be collected on walls of cells of the interconnected plurality of cells.

2. A method for making a moisture extraction assembly for use in removing moisture from compressed air, the method comprising:
providing a plurality of unitary bodies, each unitary body having a formed surface in which a plurality of recesses is provided; and
assembling the unitary bodies of the plurality of unitary bodies together with their respective formed surfaces in a facing relationship so as to close the plurality of recesses and thereby define a cellular structure of an interconnected plurality of cells, each cell of the interconnected plurality of cells being defined by at least one recess of the plurality of recesses,
wherein the assembled unitary bodies define at least one air inlet and at least one air outlet of the assembly, the at least one air inlet and the at least one air outlet being in fluid communication with respective different cells of the cellular structure to define at least one air flow path, the at least one air flow path extending from the at least one air inlet to the at least one air outlet via a plurality of cells of the interconnected plurality of cells in series,
whereby moisture can be collected on walls of cells of the interconnected plurality of cells.

3. A method of extracting moisture from air, the method comprising:
receiving an air flow through an air inlet into one or more outer annular air flow regions of a chamber delimited by a tube member and one or more annular baffles arranged inside the tube member;
directing the air flow in a first helical path having a first direction of rotation;
re-directing the air flow from the first helical path into a second helical path having a second direction of rotation which is opposite to the first direction of rotation; and
receiving the air flow into an inner axial air-flow region of the chamber delimited by one of the one or more annular baffles, the inner axial air-flow region being in fluid communication with an air outlet.

4. A moisture extractor for removing moisture from compressed air, the moisture extractor comprising:
a housing defining a chamber, the housing formed of a tube member having a tubular wall with first and second ends and a cover member arranged covering the first end of the tube member, the cover member having an air inlet and an air outlet; and
one or more annular baffles arranged extending into the chamber coaxially with the tube member, the baffles dividing the chamber into one or more parallel outer annular air-flow regions and an inner axial air-flow region, the one or more outer air-flow regions and the inner air-flow region being connected at the second end of the tube member, the air inlet communicating with the one or more outer annular air-flow regions and the air outlet communicating with the inner axial air-flow region such that an air flow path is defined from the air inlet to the air outlet via the one or more outer annular air-flow regions and the inner axial air-flow region in series,
wherein each outer annular air-flow region of the one or more outer annular air-flow regions is provided with a first array of vanes for directing air flow in a first helical path having a first direction of rotation and a second array of vanes, arranged in series with the first array, for directing air flow in a second helical path having a second direction of rotation which is opposite to the first direction of rotation.

5. A moisture extractor as claimed in claim 4, wherein each of the one or more outer annular air flow-regions is further provided with at least one further array of vanes for directing air flow in a further helical path, the at least one further array of vanes being arranged in series with the first and second arrays of vanes, wherein a flow of air through the first, second, and at least one further arrays of vanes has alternating directions of rotation.

6. A moisture extractor as claimed in claim 4, wherein the vanes of each of the first array of vanes and the second array of vanes are distributed about an axis of the moisture extractor and spaced apart in a circumferential direction.

7. A moisture extractor as claimed in claim 4, wherein one or more of the first array of vanes and second array of vanes is arranged on an inner surface of the tube member and/or an outer surface of at least one of the one of more annular baffles.

8. A moisture extractor as claimed in claim 7, wherein each vane of one or more of the first array of vanes and second array of vanes comprises an elongate wall that extends from the inner surface of the tube member and/or the outer surface of at least one of the one or more annular baffles.

9. A moisture extractor as claimed in claim 4, wherein the one or more annular baffles comprises a plurality of annular baffles that define a plurality of parallel outer annular air flow regions.

10. A moisture extractor as claimed in claim 4, further comprising a moisture extraction assembly that comprises a plurality of unitary bodies, wherein each unitary body has a formed surface in which a plurality of recesses is provided;
wherein the unitary bodies of the plurality of unitary bodies are assembled together with their respective formed surfaces in a facing relationship so as to close the plurality of recesses and thereby define a cellular structure of an interconnected plurality of cells, each cell of the interconnected plurality of cells being defined by at least one recess of the plurality of recesses,
wherein the assembled unitary bodies define at least one air inlet and at least one air outlet of the assembly, the at least one air inlet and the at least one air outlet being in fluid communication with respective different cells of the cellular structure to define at least one air flow path, the at least one air flow path extending from the at least one air inlet to the at least one air outlet via a plurality of cells of the interconnected plurality of cells in series,
whereby moisture can be collected on walls of cells of the interconnected plurality of cells.

11. A moisture extractor as claimed in claim 10, wherein the moisture extraction assembly further comprises a securing means for maintaining the assembled unitary bodies in a facing relationship, the securing means comprising a sleeve that extends around the assembled unitary bodies, wherein the sleeve serves as one of the one or more annular baffles.

12. A moisture extractor as claimed in claim 10, wherein the moisture extraction assembly is arranged to extend into the chamber from the cover member coaxially with the tube member, and wherein an annular outer wall of the moisture extraction assembly serves as one of the one or more annular baffles.

13. A moisture extraction assembly for use in removing moisture from compressed air, the assembly comprising:
   a cellular structure of interconnected cells;
   at least one air inlet and at least one air outlet, the at least one air inlet and the at least one air outlet being in fluid communication with respective different cells,
   wherein the at least one air inlet and the at least one air outlet are in fluid communication with respective different cells of the cellular structure to define at least one air flow path, the at least one air flow path extending from the at least one air inlet to the at least one air outlet via a plurality of cells in series, whereby moisture can be collected on walls of the cells,
   and wherein at least one of the cells of the cellular structure is a swirl chamber which is shaped to induce a swirling airflow within the swirl chamber.

14. A moisture extraction assembly as claimed in claim 13, wherein the walls of the swirl chamber define a minimum radius of at least 3 mm, such that the at least one cell defining the swirl chamber has a rounded internal shape.

15. A moisture extraction assembly as claimed in claim 13, wherein a cross-section of the at least one cell defining the swirl chamber is substantially circular or elliptical.

16. A moisture extraction assembly as claimed in claim 13, wherein each of the at least one air inlet and each of the at least one air outlet comprises a fluid passageway extending from an outer surface of the cellular structure to at least one of the cells, and/or wherein the cells of each air flow path are interconnected by fluid passageways.

17. A moisture extraction assembly as claimed in claim 16, wherein at least one fluid passageway is arranged in a direction that is substantially tangential to a cell with which the fluid passageway is connected.

18. A moisture extraction assembly as claimed in claim 17, wherein at least one cell of the cellular structure has at least one inlet passageway arranged tangentially to induce a swirling air flow in a first rotational direction when inside the cell, and has at least one outlet passageway arranged tangentially so as to receive a swirling air flow in a second rotational direction.

19. A moisture extraction assembly as claimed in claim 16, wherein at least one cell of the cellular structure has one or more inlet passageways and/or one or more outlet passageways each having a maximum cross-sectional area of no greater than $4\pi$ mm$^2$.

20. A moisture extraction assembly as claimed in claim 16, wherein at least one cell of the cellular structure has a plurality of inlet passageways and/or a plurality of outlet passageways, and wherein the plurality of inlet passageways and/or the plurality of outlet passageways has an aggregate cross-sectional area of at least $0.25\pi$ mm$^2$.

* * * * *